US006970588B1

(12) United States Patent  
Komatsu

(10) Patent No.: US 6,970,588 B1  
(45) Date of Patent: Nov. 29, 2005

(54) IMAGE PROCESSING APPARATUS, IMAGE PROCESSING METHOD AND VISUAL INSPECTION SYSTEM

(75) Inventor: Yukihiro Komatsu, Kyoto (JP)

(73) Assignee: Omron Corporation, Kyoto (JP)

( * ) Notice: Subject to any disclaimer, the term of this patent is extended or adjusted under 35 U.S.C. 154(b) by 516 days.

(21) Appl. No.: 09/672,901

(22) Filed: Sep. 29, 2000

(30) Foreign Application Priority Data

Sep. 30, 1999 (JP) ................................. 11-280882

(51) Int. Cl.[7] ............................................. G06K 9/00
(52) U.S. Cl. ..................... 382/141; 382/145; 438/14; 356/237.1
(58) Field of Search ................ 382/145–151, 382/141–144, 110; 438/14, 16; 356/237.1

(56) References Cited

U.S. PATENT DOCUMENTS

| 4,931,950 | A | | 6/1990 | Isle et al. |
| 5,159,546 | A | | 10/1992 | Inoue et al. |
| 5,544,256 | A | * | 8/1996 | Brecher et al. ............. 382/149 |
| 5,659,624 | A | | 8/1997 | Fazzari et al. |
| 5,699,447 | A | * | 12/1997 | Alumot et al. ............... 382/145 |
| 5,745,593 | A | | 4/1998 | Wahawisan et al. |
| 6,070,155 | A | * | 5/2000 | Cherrington et al. ....... 705/400 |
| 6,185,324 | B1 | * | 2/2001 | Ishihara et al. ............. 382/149 |
| 6,188,402 | B1 | * | 2/2001 | Csipkes et al. ............. 345/705 |
| 6,324,298 | B1 | * | 11/2001 | O'Dell et al. ............... 382/149 |
| 6,477,266 | B1 | * | 11/2002 | Asar .......................... 382/147 |

FOREIGN PATENT DOCUMENTS

| EP | 0 704 821 A2 | 4/1996 |
| EP | 0 834 831 A2 | 4/1998 |
| JP | 1-226079 | 9/1989 |
| JP | 05-002634 | 1/1993 |
| JP | 06-174446 | 6/1994 |
| JP | 06-260798 | 9/1994 |
| JP | 7-037094 | 2/1995 |
| JP | 08-101916 | 1/1996 |
| JP | 08-091543 | 4/1996 |
| JP | 08-240411 | 9/1996 |
| JP | 09-089797 | 4/1997 |
| JP | 11-120362 | 4/1998 |
| JP | 10-132532 | 5/1998 |
| KR | 1990-0016818 | 11/1990 |

OTHER PUBLICATIONS

E.K. Teoh, et al., "Real-Time Image Processing Using Transputers," *Proceedings of the International Conference on Systems, Man and Cybernetics. Le Touquet*, Oct. 17-20, 1993, New York, IEEE, US, vol. 3, pp. 505-510 (Oct. 17, 1993).

* cited by examiner

*Primary Examiner*—Bhavesh M. Mehta
*Assistant Examiner*—Aaron Carter
(74) *Attorney, Agent, or Firm*—Foley & Lardner LLP

(57) ABSTRACT

An image of a product to be inspected is taken by an electronic camera and output to a controller. An operator operates a console to apply information on setting of a desired type of inspection to the controller. When the information on the desired type of inspection is applied, a controller guides to the operator through a video monitor an operation required for setting a comparing program suitable for the desired type of inspection. The operator can set the comparing program on the controller by operating the console in accordance with a display guidance. When the comparing program is set, the controller compares the image of the product applied and a preliminary prepared reference image in accordance with the set comparing program for visual inspecting the product.

11 Claims, 37 Drawing Sheets

FIG.22

```
SCENE 0=SET=HELP:ORIENT'N 2/2
○ORIENTATION INSPECTION EXAMPLES

IC DIRECTION AND FRONT/BACK.
LABEL DIRECTION
COIL SPRING ORIENTATION

←→:SWITCH PAGE   ESC:BACK
```

FIG.23

```
SCENE 0=SET=HELP:POSITION 1/2
○POSITION INSPECTION

FINDS POSITION OF SPECIFIED
MARK (E.G., HOLE) AND DETERMINES
IF IT IS WITHIN A SPECIFIED RANGE.
```

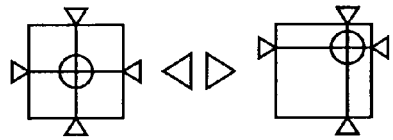

```
        ←→:SWITCH PAGE   ESC:BACK
```

FIG.24

```
SCENE 0=SET=HELP:POSITION 2/2
○POSITION INSPECTION EXAMPLES

PCB POSITIONS
LCD REGISTRATION MARK POSITIONS
PRINTING POSITIONS
LABEL POSITIONS
SCREW HOLE POSITIONS

←→:SWITCH PAGE   ESC:BACK
```

FIG.28

```
SCENE 0=SET=HELP:CHIP&BUR 2/2
○CHIP & BUR INSPECTION EXAMPLES

O RINGS
    MOLDED PLASTIC OBJECTS

⟵:SWITCH PAGE   ESC:BACK
```

FIG.29

```
SCENE 0=SET=HELP:SURFACE 1/2
○SURFACE DEFECT INSPECTION

INSPECTS FOR SCRATCHES, DIRT, ETC.,
IN A SPECIFIED REGION.
```

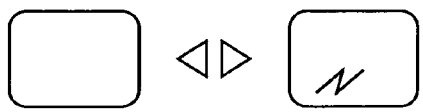

```
    ⟵:SWITCH PAGE   ESC:BACK
```

FIG.30

```
SCENE 0=SET=HELP:SURFACE 2/2
○SURFACE DEFECT INSPECT EXAMPLES

PINHOLES
    WRINKLES IN SHEETS
    LCD PANEL AIR BUBBLES
    CRACKS IN CAST METAL OBJECTS
    DIRT IN LIQUIDS

⟵:SWITCH PAGE   ESC:BACK
```

IMAGE PROCESSING APPARATUS, IMAGE PROCESSING METHOD AND VISUAL INSPECTION SYSTEM

BACKGROUND OF THE INVENTION

1. Field of the Invention

The present invention relates to image processing apparatuses, image processing methods and visual inspection systems and, more particularly, to an image processing apparatus, image processing method and visual inspection system comparing an image of a workpiece to be inspected with a reference image for visual inspection of the workpiece.

2. Description of the Background Art

An image processing apparatus suitable for use as a visual inspection system or the like, which compares an image from an electronic camera with a reference image for providing inspection of workpieces, operates as follows. An input image of a workpiece to be inspected is compared with a reference image in accordance with a comparing program set by a user for visually inspecting the target workpiece for displaying the inspection result onto a video monitor, or to a personal computer, programmable controller or the like.

Generally, examples of inspections performed by the visual inspection system include presence inspection, conformance inspection, orientation inspection, position inspection, dimension inspection, chip and burr inspection, surface defect inspection and the like, which are all common names used at a production line site.

Here, "presence inspection" determines if a component, mark, hole or the like is at a set position on the workpiece. Examples of presence inspection include inspections for missing components on PCBs (Printed Circuit Board), solder on PCB, labels and pills.

"Conformance inspection" inspects to see if a workpiece type agrees with what has been registered. Examples of conformance inspection include quality checks for grade marks and IC (Integrated Circuit) type check by the number of leads.

"Orientation inspection" inspects the direction and front/back orientation of a workpiece. Examples of orientation inspection include checks for IC direction and front/back, label direction, and coil spring orientation.

"Position inspection" finds a position of a specified mark (e.g., hole) and determines if it is within a specified range. Examples of position inspection include checks for PCB positions, LCD (Liquid Crystal Display) registration mark positions, printing positions, labels positions and screw hole positions.

"Dimension inspection" inspects the relation/distance between two specified points to see if they are within a range. Examples of dimension inspection include measurement of bolt lengths and molded object dimensions.

"Chip and burr inspection" inspects for abnormal chips and burrs on the edges of workpieces. Examples of chip and burr inspection include chips and burrs of O rings and molded plastic objects.

"Surface defect inspection" inspects for scratches, dirt and the like in a specified region. Examples of surface defect inspection include checks for pinholes, wrinkles in sheets, air bubbles in LCD panels, cracks in cast metal objects, and dirt in liquids.

Each of these types of inspections has its optimum image comparing program. Thus, a user of this type of image processing apparatus must perform a prescribed setting operation prior to inspection, so that an optimum image comparing program is set according to a target workpiece and a desired type of inspection.

However, the operation of setting the optimum image comparing program according to the target workpiece and the desired type of inspection is highly dependent on the experience and skill of the user. Thus, the user who is not well experienced with this type of image processing apparatus cannot easily perform the prescribed setting operation.

SUMMARY OF THE INVENTION

An object of the present invention is to provide an image processing apparatus, image processing method and visual inspection system in which a process of comparing images suitable for a workpiece to be visually inspected and a desired type of visual inspection can be easily set.

To achieve the above mentioned object, the image processing apparatus according to one aspect of the present invention visually inspects a workpiece by comparing an image of the workpiece with a reference image in accordance with a set process. The image process apparatus is characterized in that it includes: an inspection type inputting portion inputting a desired one of a plurality of types of inspections, and an operation guiding portion guiding an operation for setting the process suitable for the desired type of inspection input from the inspection type inputting portion.

The above mentioned operation guiding portion may visually guide the operation with use of a display portion, or acoustically guide the operation with use of a sound output portion.

With such a structure, the operation of setting the process suitable for the desired type of inspection is guided in response to the input of the desired type of inspection, so that the user may simply follow the guidance for setting the process suitable for the workpiece and the desired type of inspection. Thus, even a beginner user can easily set the process suitable for the workpiece and the desired type of inspection.

In the above mentioned image processing apparatus, the input of the desired type of inspection from the inspection type inputting portion is desirably performed with use of common inspection names of visual inspections of the workpiece for the convenience of users. Then, preferably, a menu of common inspection names respectively corresponding to the plurality of types of inspections is presented. In addition, explanations of the types of inspections corresponding to arbitrary common inspection names on the menu are preferably presented as desired. In the explanation, it is preferred that the visual inspection of the corresponding type of inspection is indicated by an illustration of the typical workpiece to be inspected. Similarly, in the explanation, it is preferable that a usage of the visual inspection of the corresponding type of inspection is illustrated.

The above mentioned common inspection names include presence inspection, conformance inspection, orientation inspection, position inspection, chip and burr inspection and surface defect inspection.

The above mentioned operation guiding portion includes: a fragment image guiding portion guiding an operation of setting a fragment image to be inspected corresponding to the desired type of inspection of the image of the workpiece; and an image characteristic guiding portion guiding an operation of setting a target image characteristic for inspection corresponding to the desired type of inspection of the image of the workpiece.

The fragment image guiding portion preferably includes a window-shape menu presenting portion presenting a menu indicating a plurality of types of window shapes available for setting the fragment image. The window may be in any shape including a box, oval, circle, circumference, polygon and the like.

Image characteristic guiding portion preferably includes an image characteristic menu presenting portion presenting a menu of a plurality of image characteristics which can be set. The image characteristic menu may include a shape, size, brightness, the number of lines and the like. Then, preferably, the image characteristic guiding portion further includes an image characteristic explanation presenting portion presenting as desired an explanation relating to an arbitrary image characteristic on the menu presented by the image characteristic menu presenting portion. In the explanation presented by the image characteristic explanation presenting portion, the arbitrary image characteristic is preferably shown by an illustration.

An image processing method according to another aspect of the present invention visually inspects a workpiece by comparing an image of a target workpiece with a reference image in accordance with a set process. The method is characterized in that it includes: an inspection type inputting step of inputting a desired one of a plurality of types of inspections; and an operation guiding step of guiding an operation for setting a process suitable for the desired type of inspection input by the inspection type inputting step.

With such a structure, the operation for setting the process suitable for the desired type of inspection is guided in response to the input of the desired type of inspection, so that a user can simply follow the guidance for setting the process suitable for the workpice and desired type of inspection. Accordingly, even a beginner user can easily set the process suitable for the workpiece and the desired type of inspection for visually inspecting the workpiece.

A visual inspection system according to still another aspect of the present invention includes: a controlling portion comparing an image of a workpiece with a reference image in accordance with a set process for determining if the workpiece is defective/non-defective based on the comparison result for output; an inputting portion for externally inputting information; and a display portion. The visual inspection system is characterized in that the controlling portion includes an inspection type identifying portion and a setting process performing portion. The inspection type identifying portion identifies, when the menu of common inspection names respectively corresponding to a plurality of types of inspection in visual inspection of workpieces is displayed onto a display portion, a desired type of inspection from a displayed menu based on the information input from the inputting portion. The setting process performing portion performs a process for settings based on the information input from the inputting portion when a guidance to the operation for setting the process suitable for the desired type of inspection recognized by the inspection type identifying portion is displayed onto the display portion.

With such a structure, the operation for setting the process suitable for the desired type of inspection is guided in response to the input of information, so that a user can simply follow the guidance for setting the process suitable for the workpiece and the desired type of inspection. Accordingly, even a beginner user can easily set the process suitable for the workpiece and the desired type of inspection.

In the above described visual inspection system, the setting of the desired type of inspection by inputting the information from the inputting portion is desirably performed using common inspection names for visual inspection of the workpieces for the convenience of users. The common inspection names include presence inspection, conformance inspection, orientation inspection, position inspection, dimension inspection, chip and burr inspection, surface defect inspection and the like.

The above described visual inspection system may further include a pickup portion picking up an image of the workpiece for outputting it to a controlling portion. In this case, the image of the target workpiece can be incorporated from an external portion. The reference image may be an image picked up by the pickup portion for output. In this case, the reference image can easily be updated as necessary.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a diagram shown in conjunction with a screen for providing specific examples of orientation inspection.

FIG. 23 is a diagram shown in conjunction with a screen for providing a definition of position inspection.

FIG. 24 is a diagram shown in conjunction with a screen for providing specific examples of the position inspection.

FIG. 28 is a diagram shown in conjunction with a screen for providing specific examples of the chip and burr inspection.

FIG. 29 is a diagram shown in conjunction with a screen for providing a definition of surface defect inspection.

FIG. 30 is a diagram shown in conjunction with a screen for providing specific examples of the surface defect inspection.

DESCRIPTION OF THE PREFERRED EMBODIMENTS

A preferred embodiment of the present invention will now be described in detail with reference to the drawings.

Figure 1:
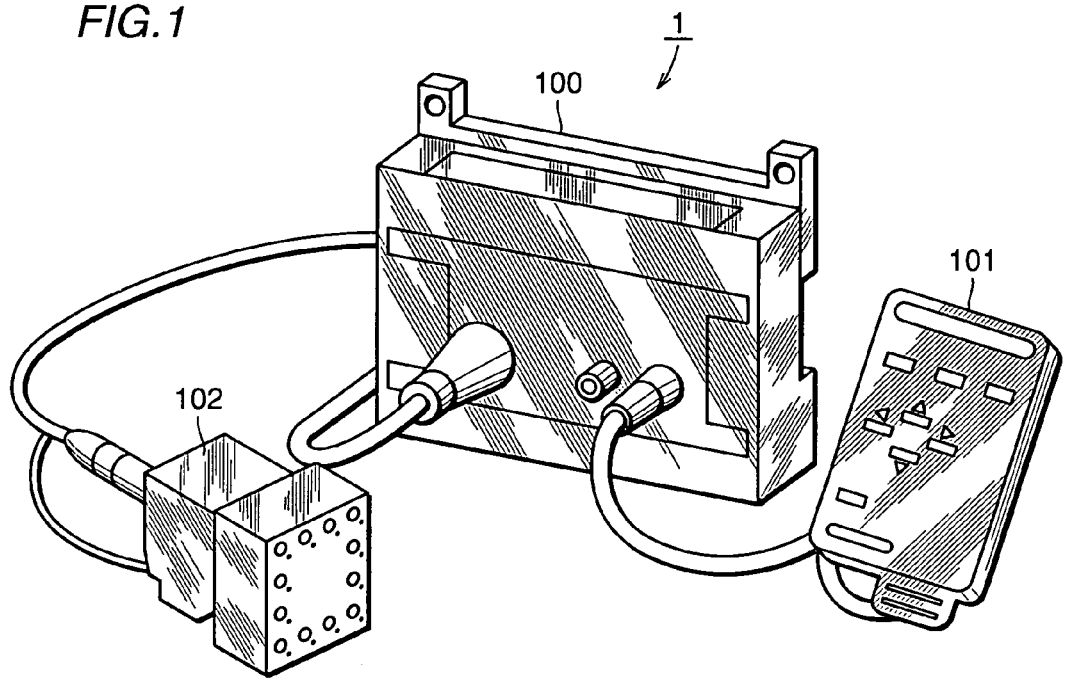
FIG. 1 is an illustration showing a visual inspection system according to an embodiment of the present invention.

FIG. 1 generally shows an illustration of a visual inspection system according to the present embodiment. As shown, a visual inspection system 1 at least includes: a controller 100 corresponding to an image processing apparatus according to the present embodiment; a handy type input device (hereinafter referred to as a console) 101 for applying various instructions to controller 100; and an electronic camera 102 (hereinafter referred to as camera 102) for inputting an arbitrary image to controller 100.

Figure 2:
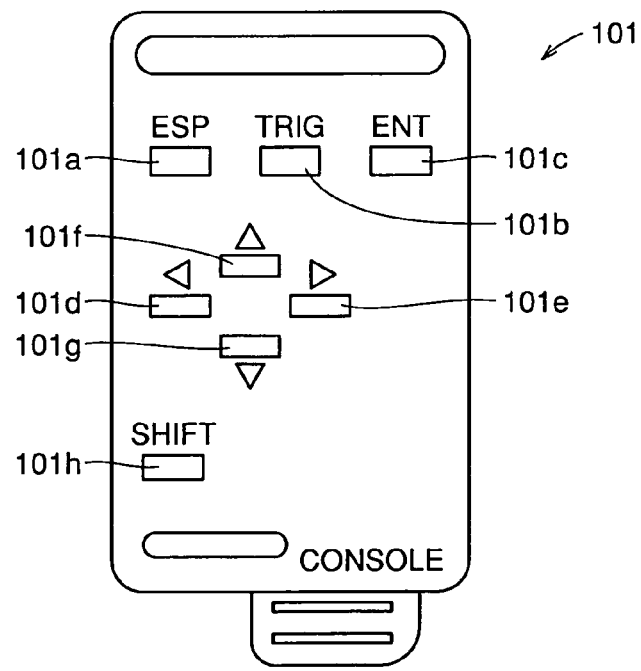
FIG. 2 is an illustration showing a key arrangement of a console of FIG. 1.

A key arrangement of console 101 is shown in FIG. 2. As shown, an operation panel of console 101 has an escape key (ESP) 101*a*, a trigger key (TRIG) 101*b*, an enter key (ENT) 101*c*, a left key 101*d*, a right key 101*e*, an up key 101*f*, a down key 11*g*, and a shift key (SHIFT) 101*h*. These keys 101*a* to 101*h* are used to apply various instructions to controller 100.

Figure 3:
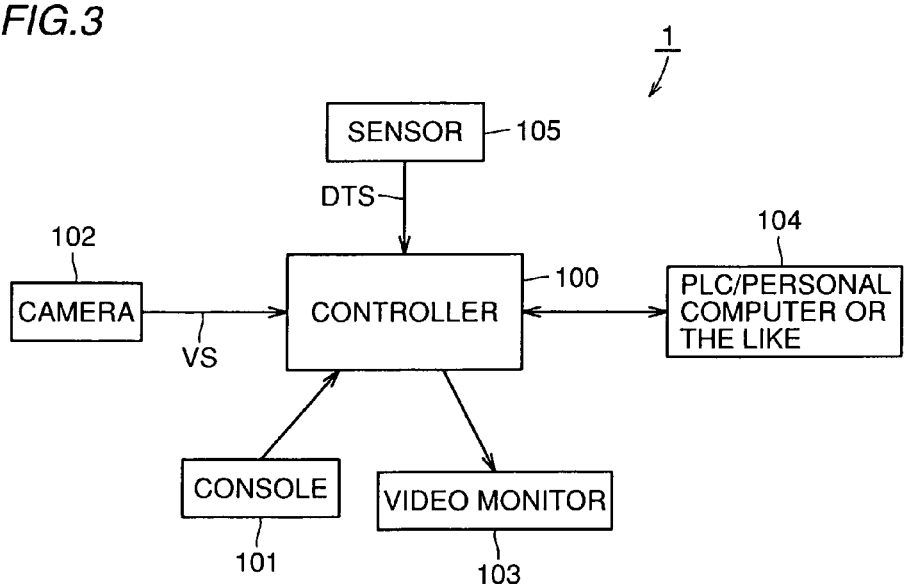
FIG. 3 is a diagram showing an arrangement of the visual inspection system according to the embodiment of the present invention.

FIG. 3 shows an overall arrangement of the visual inspection system. As shown, visual inspection system 1 includes: console 101 for applying various instructions to controller 100 forming an image processing apparatus; camera 102 taking an image of a target object and applying a video signal VS of the image of the object to controller 100; a video monitor 103 for visually outputting various information including a status of controller 100 to an external portion; a PLC (Programmable Logic Controller)/personal computer or the like 104 connected to a parallel input/output through an RS-232C; and a synchronous sensor 105 for applying a detection signal DTS to controller 100.

Figure 4:
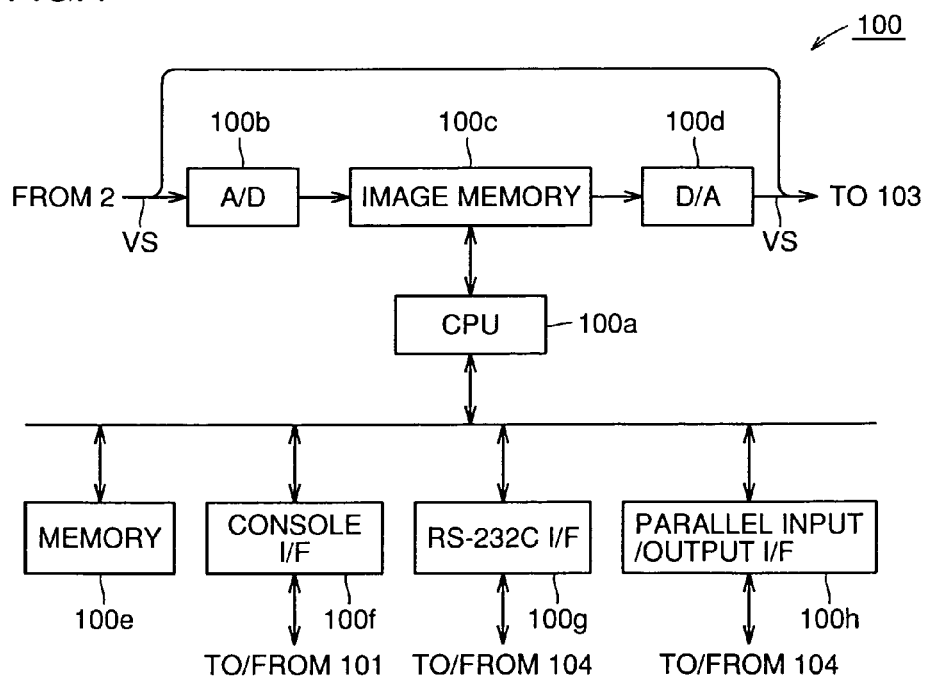
FIG. 4 is a block diagram showing a hardware structure of a controller shown in FIG. 1.

The hardware structure of controller 100 is shown in FIG. 4. As shown, controller 100 includes: a CPU 100a; an A/D (Analog to Digital) converter 100b inputting video signal VS applied from camera 2 for converting it to image data for output; an image memory 100c; a D/A(Digital to Analog) converter 100d; a memory 100e; a console interface (I/F) 100f; an RS232C interface (I/F) 100g; a parallel input/output interface (I/F) 100h.

CPU 100a consists mainly of a microprocessor and acts as a central portion for control of controller 100.

The image data output from A/D converter 100b is stored in image memory 100c. When read out from image memory 100c, the image data is converted to original video signal VS through D/A converter 100d. Video signal VC is then applied to video monitor 103 and an image corresponding to the video signal is displayed. Here, a DMA (Direct Memory Access) controller for use in transferring image data or the like is not provided. Video monitor 103 is directly supplied with video signal VS output from camera 102 for displaying an image corresponding to video signal VS.

Memory 100e is used for example as a temporary storage area and work area of various data used by CPU 100a for operation. Console 101 shown in FIGS. 1 and 2 is connected through a prescribed cable to console I/F 100f.

PLC/personal computer or the like 104 is connected to RS-232C interface 100g and parallel input/output interface 100h through a prescribed serial and parallel lines.

Figure 5:
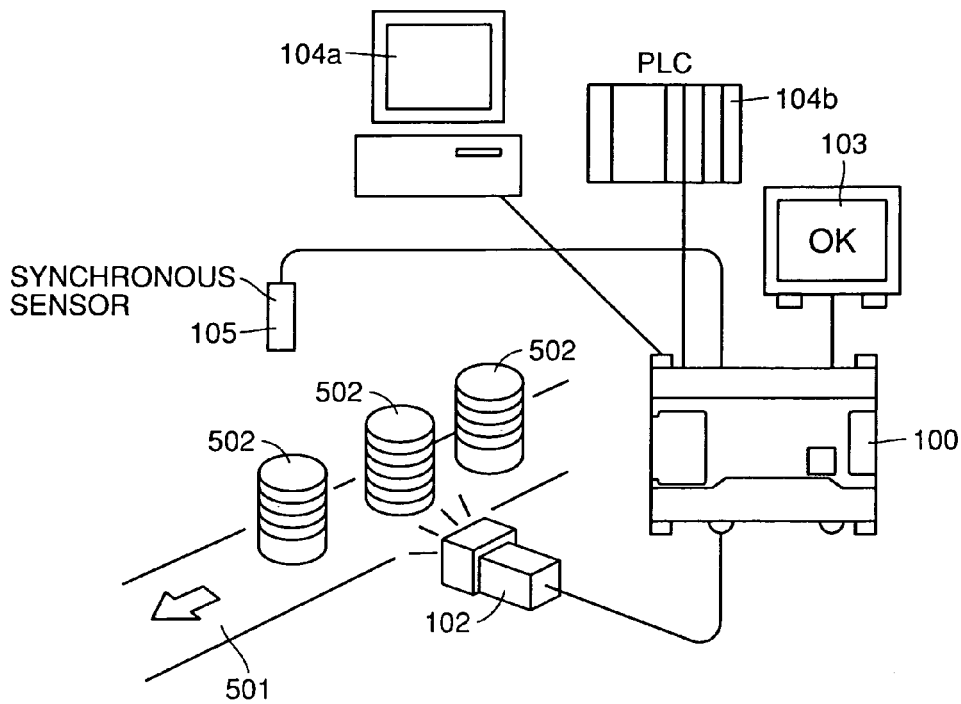
FIG. 5 is a schematic illustration showing an application of the visual inspection system.
Figure 79:
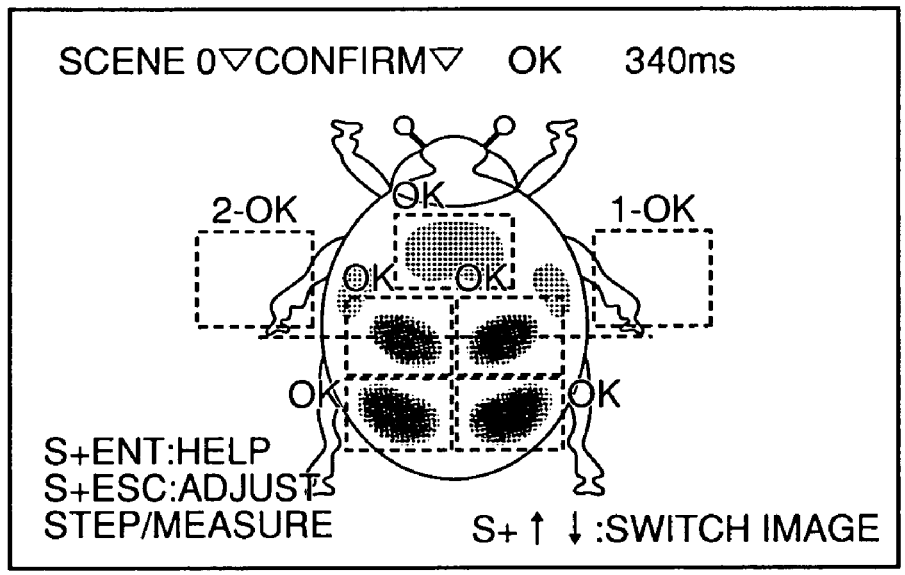
FIG. 79 is a diagram shown in conjunction with a screen for confirming/measuring.

FIG. 5 schematically shows an application of the visual inspection system. As shown, the application provides for taking images of products 502 transported by a belt conveyer 501 for image processing and determining if products 502 are non-defective (OK) or defective (NG). The image taken by camera 102 is incorporated to controller 100 and compared with a preliminary stored reference image in accordance with a comparing program set by a user. The product information of the comparison result is transmitted to video monitor 103 and visually notified to an operator (FIG. 79). In addition, the product information is transmitted to personal computer 104a to be subjected to a data process such as aggregation, and further transmitted to PLC 104b as facility control information. The reference image is compared with the image of product 502 for determination of the status of product 502 based on the comparison result.

Synchronous sensor 105 detects a time at which product 502 comes into view of camera 102 while being transported on belt conveyer 501 in a direction indicated by an arrow in the drawing. Detection signal DTS is input to an STEP terminal (not shown) of controller 100. As will later be described, controller 100 drives camera 102 in synchronization with the input of detection signal DTS to the STEP terminal for inputting the image of product 502.

As stated previously, controller 100 compares the image taken by camera 102 with the preliminary stored reference image for determining the status of product 502 and outputs the determination result. To achieve a proper comparison or determination process, the reference image and comparing program must be preliminary taught to or set in controller 100 in an appropriate manner. The teaching or setting operation is performed using console 101 and video monitor 103. The present invention is mainly characterized in that even a beginner user can easily perform the teaching or setting operation in accordance with an operation guidance of an expert system on a screen of video monitor 103. It is noted that the operation guidance to the operator cannot be performed only by display of video monitor 103 but also by sounds while making use of a sound synthesis LSI (Large Scale Integration).

Figure 6:
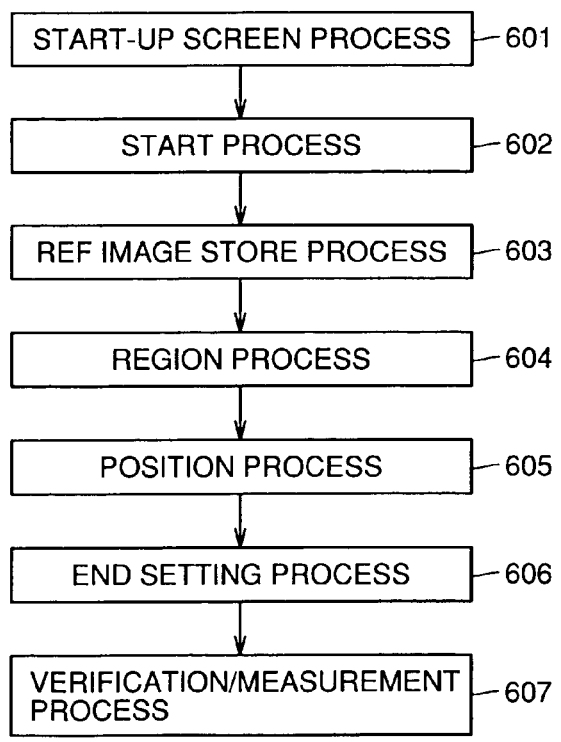
FIG. 6 is a general flow chart schematically showing an overall setting process.
Figure 7:
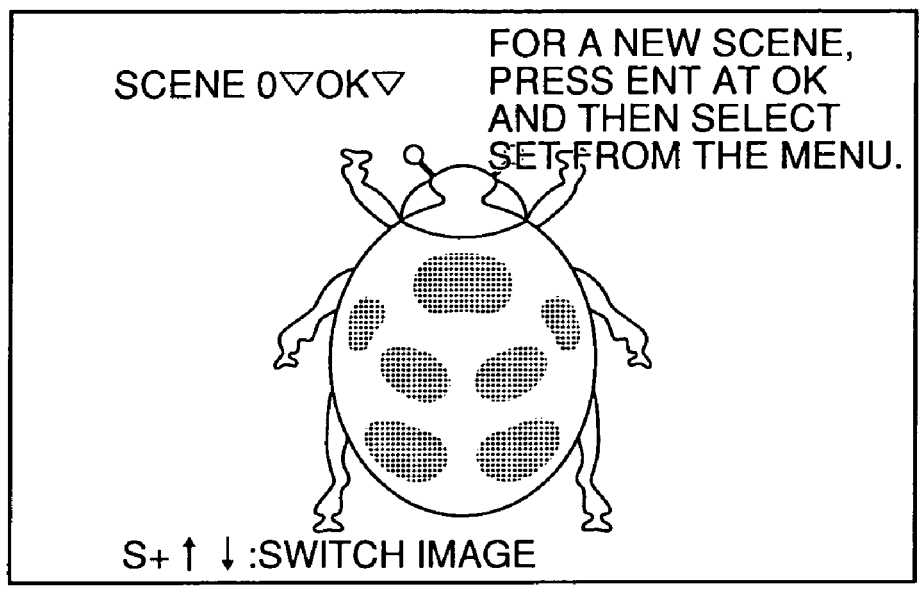
FIG. 7 is a diagram shown in conjunction with a screen upon start-up.

An overall flow of the teaching or setting operation is schematically shown in FIG. 6. As shown, the overall process includes a start-up process, a setting start process, a reference image storing process, an inspection range process, a position compensation process, a setting end process, and a verification/measurement process (steps 6101 to 607). An exemplary screen upon start-up of the system is shown in FIG. 7. As shown, displayed on a screen of video monitor 103 upon start-up is a guidance reading that "for a new scene, press ENT key at OK and then select SET from the displayed menu." Note that upward and downward arrows and a guidance "display" shows that the image can be switched by up and down keys 101f and 101g. In addition, as will also be applied to the subsequent drawings of the screen, a ladybird illustrated at the center of the screen merely shows an exemplary image for convenience. Needless to say that the image inherently shows an appearance of an industrial product or the like.

When the screen of FIG. 7 is displayed on video monitor 103, if ENT key 101c is pressed at OK, the process proceeds to the setting start process (a step 602).

Figure 8:
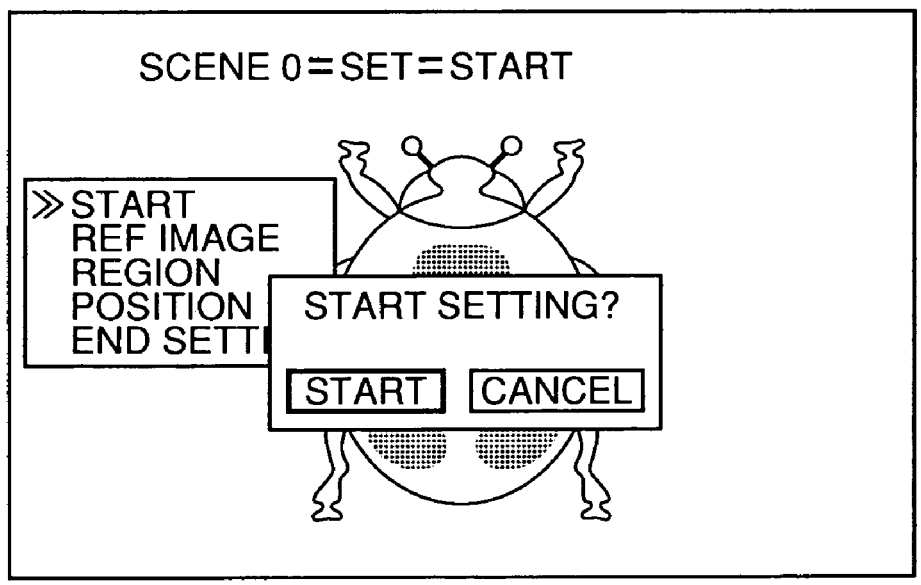
FIG. 8 is a diagram shown in conjunction with a screen upon start-up setting.

FIG. 8 shows the screen at the start of setting. As shown, the screen displays at the upper left corner thereof five options to select "start setting," "reference image," "inspection region," "position compensation," and "end setting." In this state, if the operator selects "start setting" using up and down keys 101f and 101g, a confirmation "start setting" and two options to select "start" and "stop" for confirming the intention of the operation are displayed at the central portion of the screen. Then, if the operator selects "start," a series of setting processes for selecting the image characteristic teaching or inspecting method start (step 602).

Figure 9:
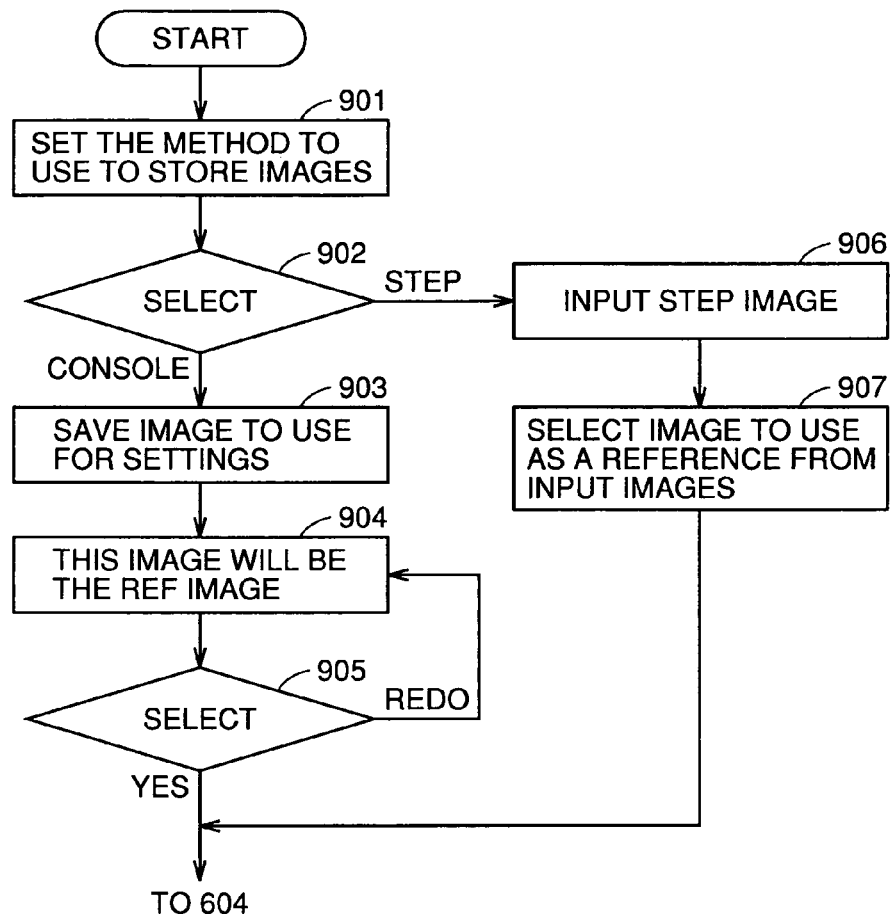
FIG. 9 is a flow chart showing a setting process for storing a reference image.

First, the reference image storing process is performed (a step 603). FIG. 9 shows a flow chart of a setting process for storing the reference image. As shown, when the process is started, the operator receives an instruction to set the method to store the image (a step 901).

Figure 10:
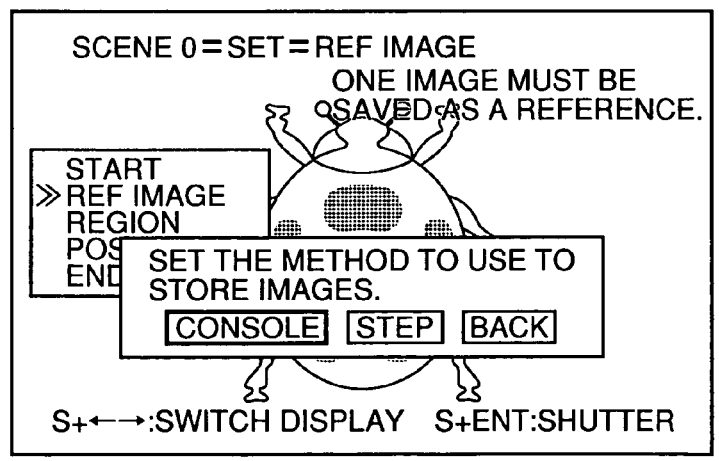
FIG. 10 is a diagram shown in conjunction with a screen for inquiring as to a method of storing an image.

FIG. 10 shows a screen for instructing to set the image storing method. As shown, at the central portion of the screen of video monitor 103, an instruction to set the image storing method reading that "set the method to use to store the image" and three options to select "console," "STEP," and "back" are displayed. In this situation, the operator selects one of "console" and "STEP."

Note that the upper left portion of the screen continues to display five options to select as described above, i.e., "start setting," "reference image," "inspection region," "position compensation," and "end setting," thereby enabling the operator to recognize the process presently in progress, as indicated by a symbol "≫." Here, since the reference image storing process is in progress, "reference image" is denoted by symbol "≫."

Then, if the operator selects "console" ("console" in step 902), successively, an instruction is given to store an image to use for settings (a step 903).

Figure 11:
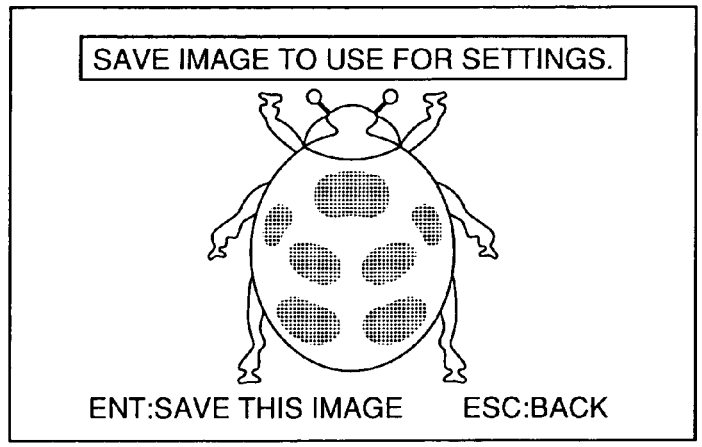
FIG. 11 is a diagram shown in conjunction with a screen instructing to save the image to use for setting.

FIG. 11 shows a screen instructing to save the image used for the settings. As shown, the upper portion of the screen displays an instruction reading "save image to use for settings." In this state, if the operator presses ENT key 101c, the image which has been incorporated by camera 102 and is presently displayed on video monitor 103 is stored as image data in image memory 100c. Thereafter, a process of confirming as to if the image of the stored image data is to be used as a reference for inspection is performed (a step 904).

Figure 12:
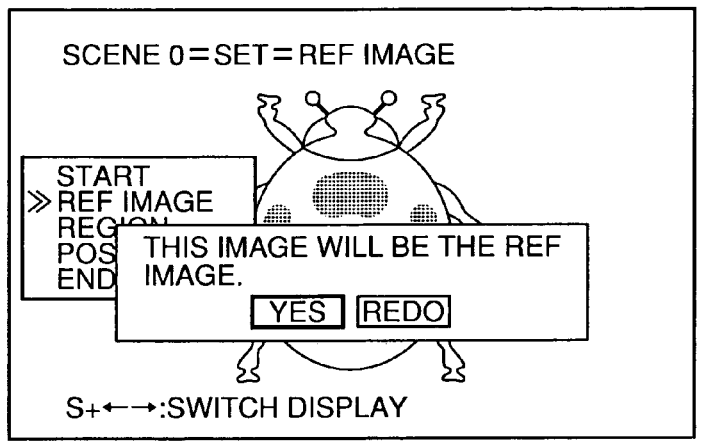
FIG. 12 is a diagram shown in conjunction with a screen for determining the image used for setting.

FIG. 12 shows a screen for confirming the image used for settings. As shown, the central portion of the screen displays a confirmation reading "this image will be the reference image" and two options to select "yes" and "redo" for confirming the intention of the operator. In this state, if the operator follows the operation guide to select "yes" (yes in a step 905), the image is determined as a reference image. On the other hand, if "redo" is selected (redo in step 905), the operation is reperformed.

Figure 13:
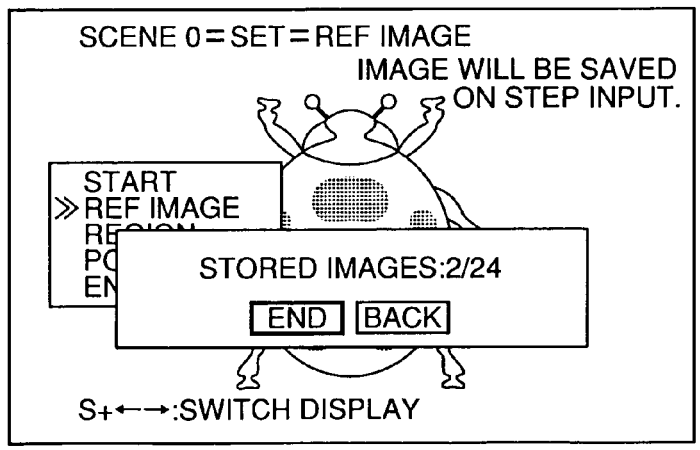
FIG. 13 is a diagram shown in conjunction with a screen when an STEP image is input.

If "STEP" is selected on the screen for inquiring as to the method of storing the image as shown in FIG. 10 (STEP in step 902), the STEP image inputting process is performed (a step 906). In the STEP image inputting process, the image data of product 502 which has been taken by camera 102 is stored in image memory 100c upon input of detection signal DTS from synchronous sensor 105 to the STEP terminal. FIG. 13 shows a screen during the STEP image inputting process. In FIG. 13, the central portion of the screen displays a term "stored images: 2/24" indicating the number of images of product 502 stored as image data in image memory 100c and two options to select "end" and "back." The screen shows that at most 24 image data can be stored in image memory 100c. If the operator selects "end" in this state, the process proceeds to a process of selecting the image data corresponding to the reference image from the image data in image memory 100c (a step 907).

Figure 14:
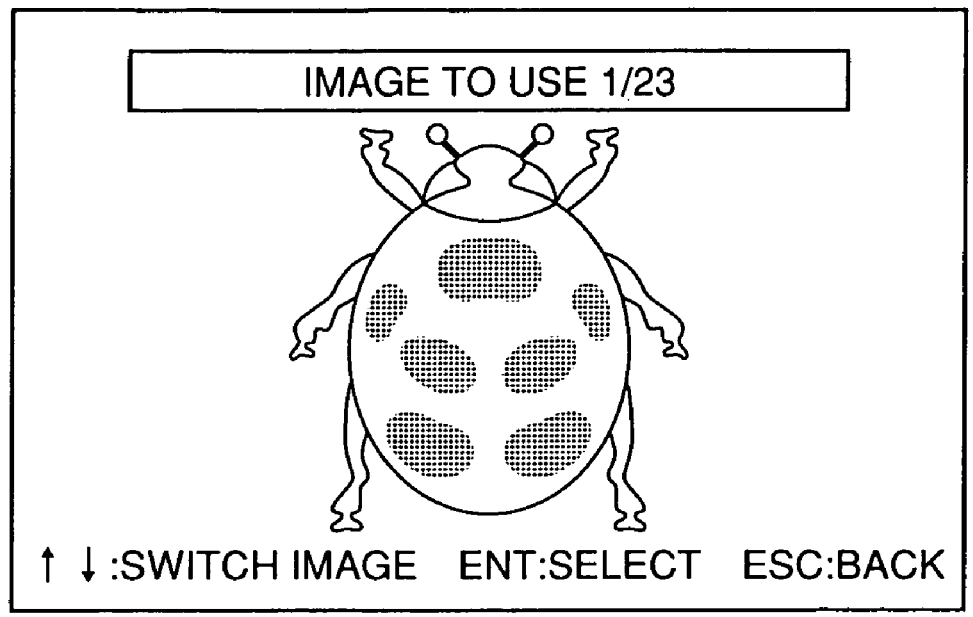
FIG. 14 is a diagram shown in conjunction with a screen for inquiring as to a reference image.

FIG. 14 shows a screen for instructing to select the reference image. As shown, the upper portion of the screen displays "image to use." Thus, in this state, the operator can press upward and downward keys 101f and 101g to properly switch screens and successively display 24 images onto the monitor. Then, the operator can press ENT key 101c in this state for performing a selecting operation, the image used as a reference can be selected from the input images.

Figure 15:
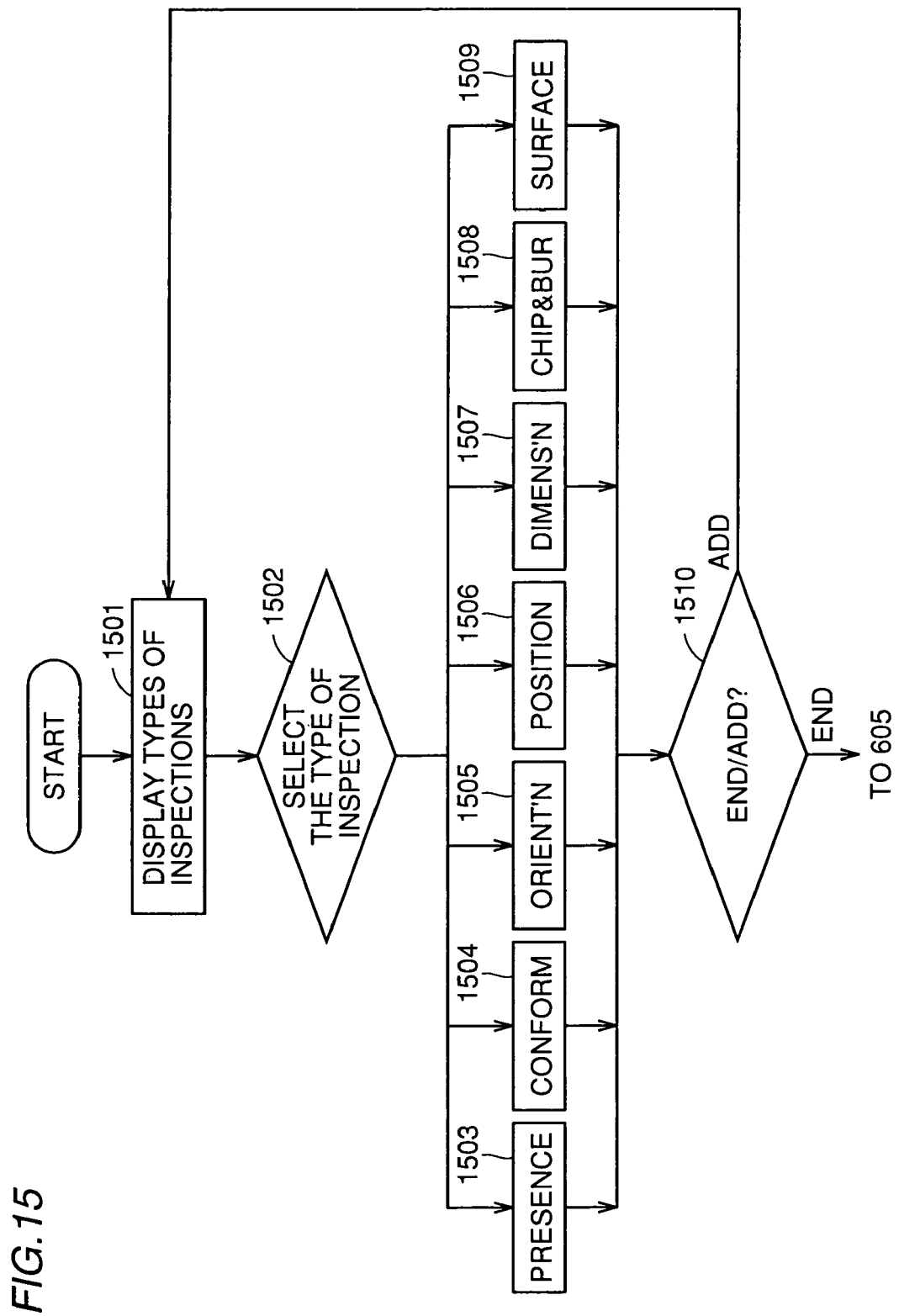
FIG. 15 is a general flow chart schematically showing a setting process related to an inspection region.

Then, the process proceeds to a setting process for an inspection region (an inspection region process step 604). A general flow chart of FIG. 15 schematically shows a setting operation for the inspection region.

As shown, at the start of the process, first, the types of inspections are displayed (a step 1501). Seven types of inspections are prepared here.

Figure 16:
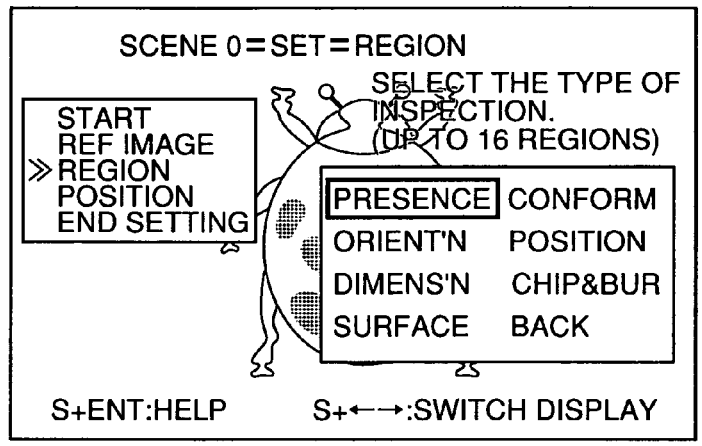
FIG. 16 is a diagram shown in conjunction with a screen for inquiring as to a type of inspection.
Figure 17:
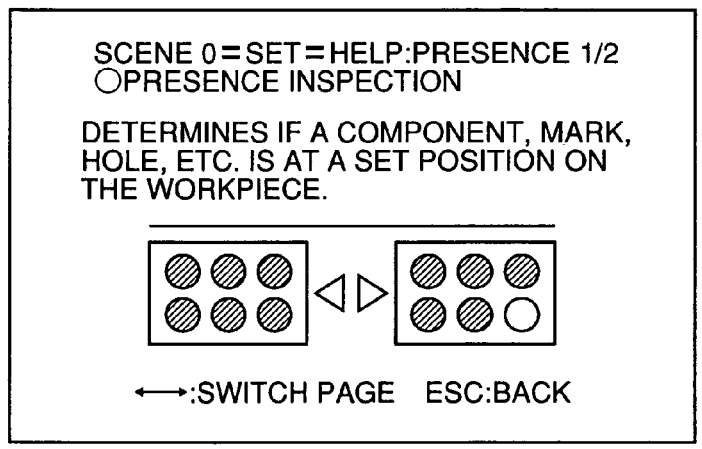
FIG. 17 is a diagram shown in conjunction with a screen for providing a definition of the presence inspection.
Figure 18:
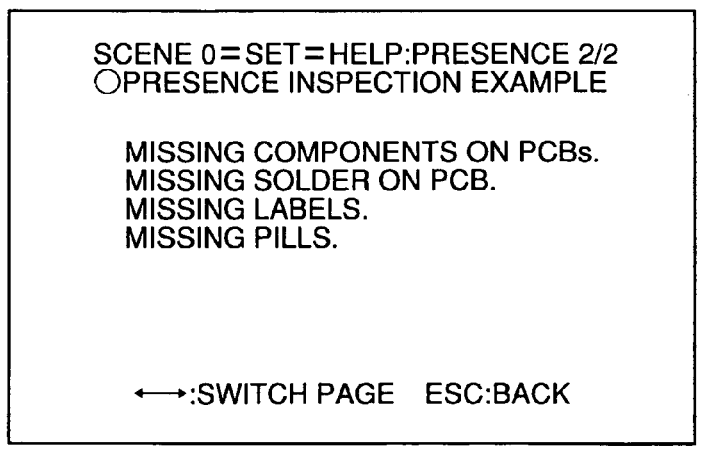
FIG. 18 is a diagram shown in conjunction with a screen for providing specific examples of the presence inspection.

FIG. 16 shows the screen for instructing selection of the types of inspections. The upper right portion of the illustrated screen displays an instruction "select the type of inspection" for instructing selection of the type of inspection. The right portion of the screen displays seven options to select as to the type of inspection "presence inspection," "conformance inspection," "orientation inspection," "position inspection," "dimension inspection," "chip and burr inspection," and "surface defect inspection." The lower left portion of the screen displays a key operation ("S+ENT: Help") for calling a screen explaining a content and specific examples of the designated type of inspection (hereinafter referred to as "to call Help"). In this state, if the operator follows the operation guidance to press the key of console 101 to call "Help," the content of the designated type of inspection (hereinafter referred to as a meaning content) and specific examples thereof are displayed onto the screen in response to the calling request. FIGS. 17 and 18 show exemplary screens when "presence inspection" is designated as the type of inspection for calling Help. FIG. 17 shows the meaning content of "presence inspection," whereas FIG. 18 shows specific examples of "presence inspection."

An explanation of the meaning content of the presence inspection reading "presence inspection determines if a component, mark, hole and the like is at a set position on the workpiece" is displayed. In addition, an illustration of the meaning content of the presence inspection is displayed approximately at the lower portion of the screen. In this example, two boxes are arranged opposite to each other, each having six circles therein. The circles in the left box are all blackened, whereas only one circle of the right box is blanked out. The operator can intuitively understand the meaning content of the presence inspection. The typical workpiece of the presence inspection is indicated by the illustration.

As shown in FIG. 18, the screen showing the specific examples of the presence inspection displays, as the specific example in the industry where the presence inspection is used, explanations "presence inspection examples," "check for missing components on PCBc," "check for missing solder on PCB," "check for missing labels," and "check for missing pills." Thus, the operator can easily understand the situation where the presence inspection is selected by referring to these specific examples.

Figure 19:
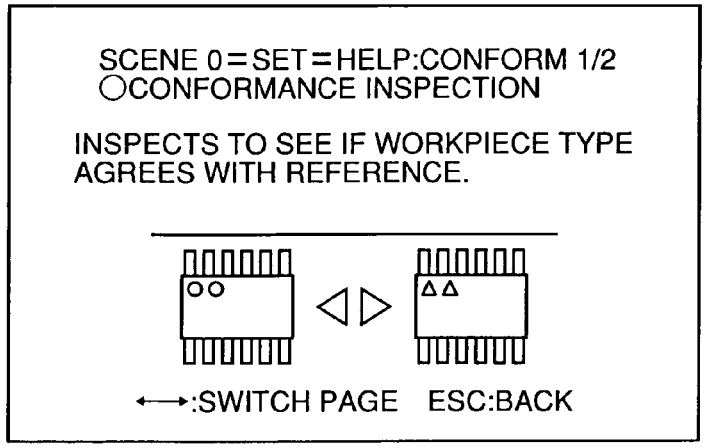
FIG. 19 is a diagram shown in conjunction with a screen for providing a definition of conformance inspection.
Figure 20:
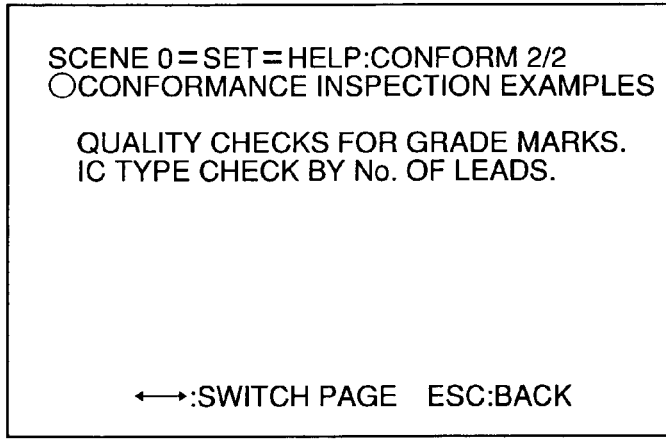
FIG. 20 is a diagram shown in conjunction with a screen for providing specific examples of conformance inspection.

FIGS. 19 and 20 show the display contents of the screen when the conformance inspection is designated and Help is called. FIG. 19 shows a screen of the meaning content of the conformance inspection, whereas FIG. 20 shows a screen of specific examples of the conformance inspection.

In FIG. 19, approximately the upper half of the screen displays an explanation of the meaning content of the conformance inspection reading "conformance inspection inspects to see if a workpiece type agrees with reference." Approximately the lower half of the screen displays an illustration showing the meaning content of the conformance inspection. In this example, two DIPs (Dual Inline Package) are arranged opposite to each other, having different identification marks. Thus, the operator can make reference to the illustration to intuitively understand the meaning content of the conformance inspection.

The screen of FIG. 20 displays specific examples of conformance inspection "conformance inspection examples," "quality checks for grade marks" and "IC type check by the number of leads." The operator can easily understand the situation where the conformance inspection is to be used by referring to the explanation.

Figure 21:
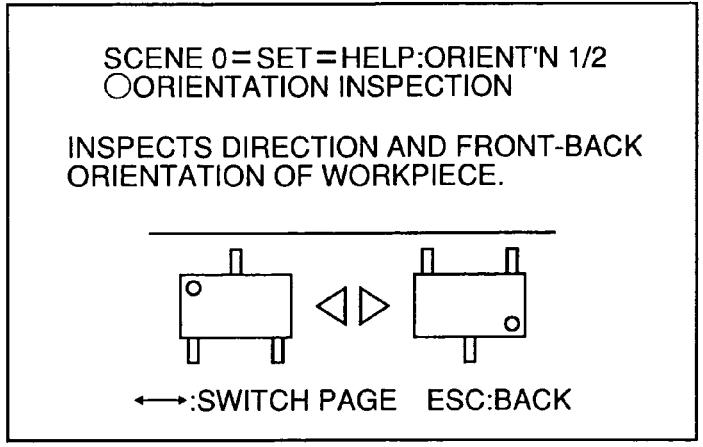
FIG. 21 is a diagram shown in conjunction with a screen for providing a definition of orientation inspection.

FIGS. 21 and 22 show the display contents of the screen when orientation inspection is designated and Help is called. FIG. 21 shows the screen of the meaning content of the orientation inspection, whereas FIG. 22 shows the screen of the specific examples of the orientation inspection.

Approximately the upper half of the screen of FIG. 21 displays an explanation of the meaning content of the orientation inspection reading "orientation inspection inspects direction and front-back orientation of workpiece." Approximately the lower half of the screen displays an illustration of the meaning content of the orientation inspection. In this example, two IC packages having alignment marks are arranged opposite to each other, being asymmetrical in upward and downward directions. The operator can intuitively understand the meaning content of the orientation inspection by referring to the illustration.

The screen of FIG. 22 shows specific examples of the orientation inspection "orientation inspection examples," "IC direction and front/back," "label direction," and "coil spring orientation." The operator can easily understand the situation where the orientation inspection is to be used by referring to the explanation.

FIGS. 23 and 24 show the content of the screen when the position inspection is designated and Help is called. FIG. 23 shows the screen of a meaning content of the position inspection, whereas FIG. 24 shows a screen of specific examples of the position inspection.

Approximately the upper half of the screen of FIG. 23 displays an explanation of the meaning content of the position inspection reading "position inspection finds position of specified mark (e.g., hole) and determines if it is within a specified range." Approximately the lower half of the screen displays an illustration of the meaning content of the position inspection. In this example, two squares each having one circle are arranged opposite to each other. The circle in the left square is positioned at the center of the square, whereas the circle in the right square is positioned at the upper right portion of the square. The operator can intuitively understand the meaning content of the position inspection by referring to the illustration.

The screen of FIG. 24 displays specific examples of the position inspection "position inspection examples," "check for PCB positions," "check for LCD registration mark positions," "check for printing positions," "check for label positions," and "screw hole positions." The operator can easily understand the situation where the position inspection is to be used by reading the explanation.

Figure 25:
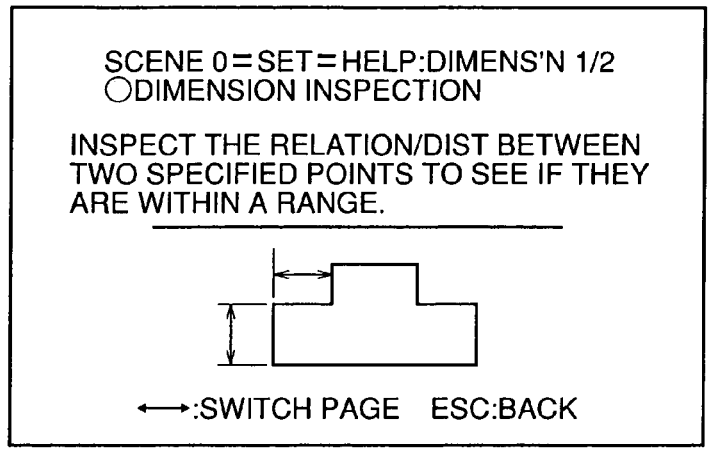
FIG. 25 is a diagram shown in conjunction with a screen for providing a definition of dimension inspection.
Figure 26:
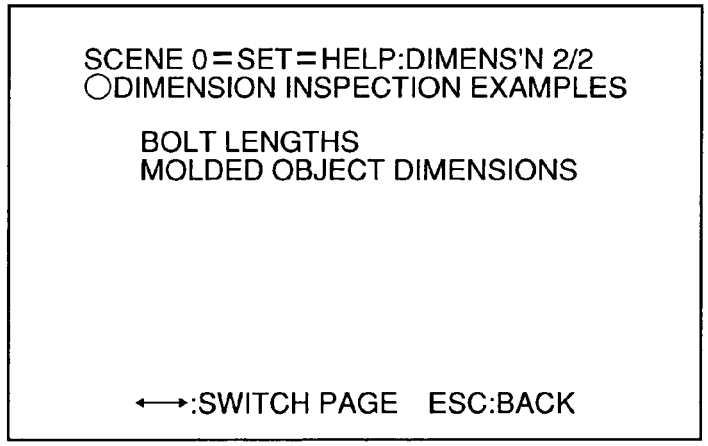
FIG. 26 is a diagram shown in conjunction with a screen for providing specific examples of the dimension inspection.

FIGS. 25 and 26 show the contents of the screen when the dimension inspection is designated and Help is called. FIG. 25 shows the screen of the meaning content of the dimension inspection, whereas FIG. 26 shows the screen of specific examples of the dimension inspection.

Approximately the upper half of the screen of FIG. 25 displays an explanation of the meaning content of the dimension inspection reading "dimension inspection inspects the relation/distance between two specified points to see if they are within a range." Approximately the lower half of the screen displays and illustration of the meaning content of the dimension inspection. In this example, a stair-like figure which looks like a victory stand is depicted, where dimensional arrows are depicted along the height of the lower stage and along the distance between the left ends of the upper and lower stages.

Referring to the illustration, the operator can intuitively understand the meaning content of the dimension inspection.

The screen of FIG. 26 displays specific examples of the dimension inspection "dimension inspection examples," "checks for bolt length," and "checks for molded object dimensions." The operator can easily understand the situation where the dimension inspection is to be used by referring to the explanation.

Figure 27:
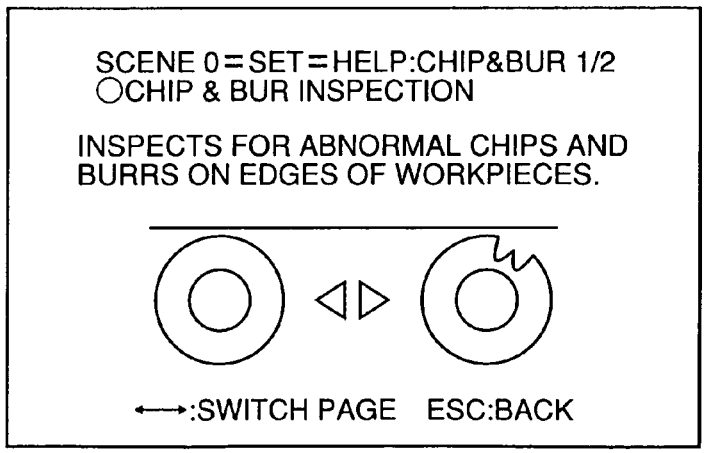
FIG. 27 is a diagram shown in conjunction with a screen for providing a definition of chip and burr inspection.

FIGS. 27 and 28 show the contents of the screen when chip and burr inspection is designated and Help is called. FIG. 27 shows a screen of the meaning content of the chip and burr inspection, whereas FIG. 28 shows a screen of specific examples of the chip and burr inspection.

Approximately the upper half of the screen of FIG. 27 displays an explanation of the meaning content of the chip and burr inspection reading that "chip and burr inspection inspects for abnormal chips and burrs on edges of workpieces." Approximately the lower half of the screen displays an illustration showing the meaning content of the chip and burr inspection. In this example, two blackened rings are arranged opposite to each other. The left ring does not have any cutaway portion, whereas the right ring has a cutaway portion at its periphery. The operator can intuitively understand the meaning content of the chip and burr inspection by referring to the illustration.

The screen of FIG. 28 displays specific examples of the chip and burr inspection "chip and burr inspection examples," "inspection for O rings" and "inspection for molded plastic objects." The operator can easily understand the situation where the chip and burr inspection is to be used by referring to the explanation.

FIGS. 29 and 30 show the contents of the screen when the surface defect inspection is designated and Help is called. FIG. 29 shows a screen of the meaning content of the surface defect inspection, whereas FIG. 30 shows a screen of specific examples of the surface defect inspection.

Approximately the upper half of the screen of FIG. 29 displays an explanation of the meaning content of the surface defect inspection reading that "surface defect inspection inspects for scratches, dirt, etc., in a specified region." Approximately the lower half of the screen displays an illustration of the meaning content of the surface defect inspection. In this example, two boxes with rounded corners are arranged opposite to each other. The left box is free from scratches or dirt, whereas the right square has scratches and dirt. The operator can intuitively understand the meaning content of the surface defect inspection by referring to the illustration.

FIG. 30 displays specific examples of the surface defect inspection "surface defect inspection examples," "checks for pinholes," "checks for wrinkles in sheets," "checks for LCD panel air bubbles," "checks for cracks in cast metal objects," and "checks for dirt in liquid." The operator can easily understand the situation where the surface defect inspection is to be used by referring to the explanation.

Figure 31:
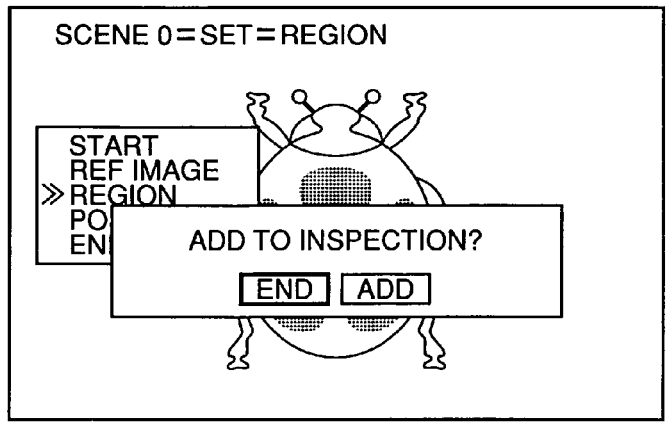
FIG. 31 is a diagram shown in conjunction with a screen for inquiring as to if an inspection content is to be added/completed.

Having understood the meaning content of each inspection in accordance with the above described screen display, the operator selects a desired type of inspection on a screen shown in FIG. 16, so that any of setting processes of seven image comparing programs is performed (steps 1503 to 1509) in accordance with the selected type of inspection (step 1502 of FIG. 15). After any of setting processes is performed, an inquiry appears on the screen of FIG. 31 as to if the type of inspection is added for execution or the process ends (a step 1510). Here, if "end" is selected, a series of processes end. On the other hand, if "add" is selected, the process returns to the above described step 1501 for repeating similar processes.

Figure 32:
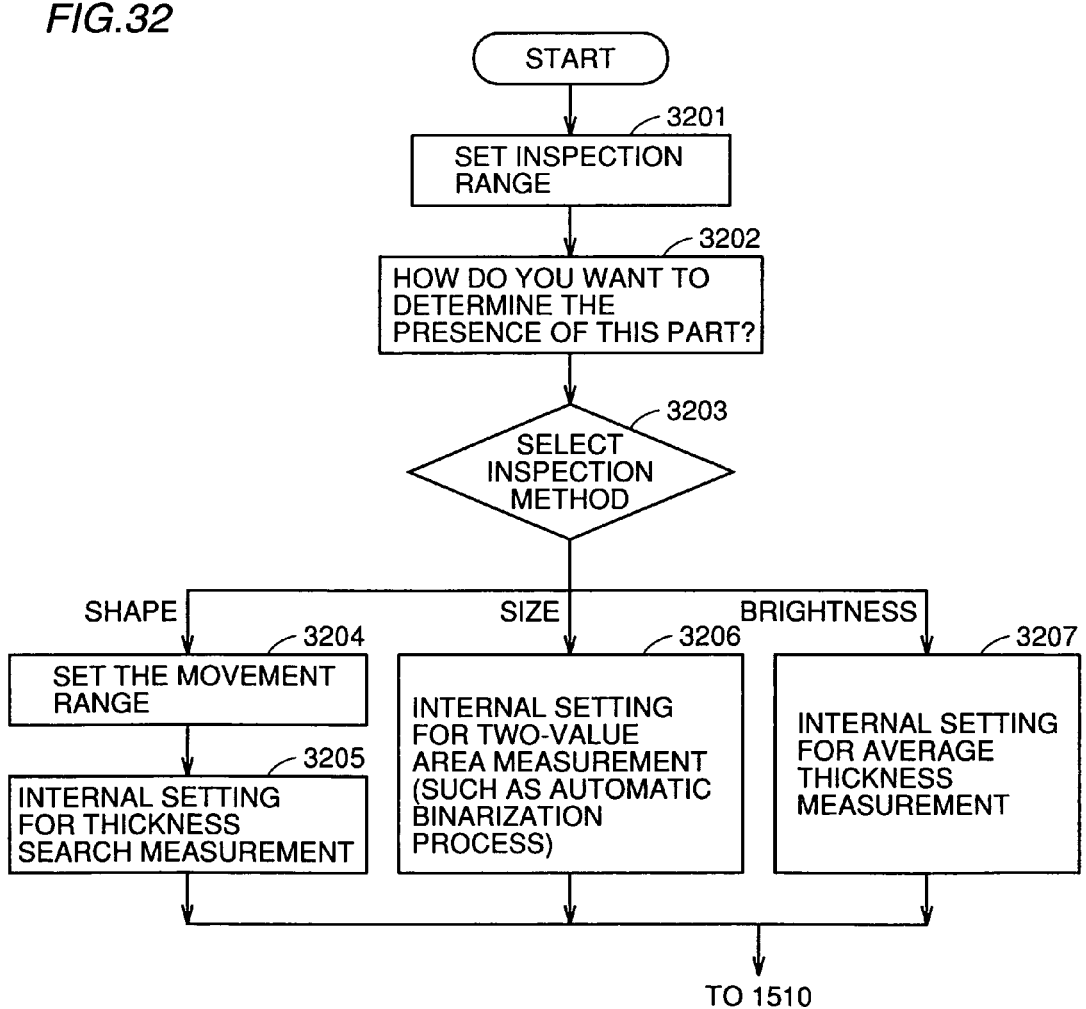
FIG. 32 is a flow chart showing a setting process for the presence inspection.
Figure 33:
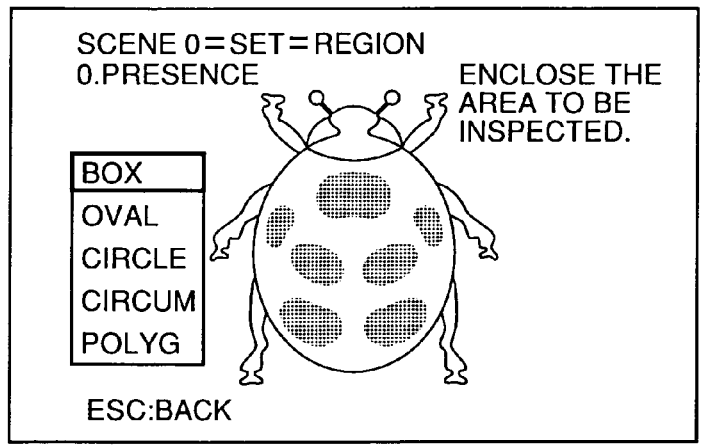
FIG. 33 is a diagram shown in conjunction with a screen for determining the inspection range.
Figure 34:
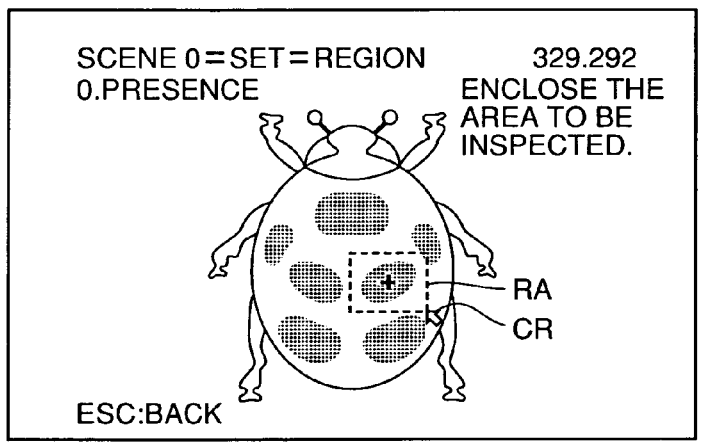
FIG. 34 is a diagram shown in conjunction with a screen in setting the inspection range.

FIG. 32 shows a flow chart of a setting process for presence inspection. Upon the start of the process in FIG. 32, an inspection range setting process is performed (a step 3201). The operation of setting the inspection range is performed in accordance with an operation guidance on screens of FIGS. 33 and 34. FIG. 33 shows a screen for instructing to set the inspection range, whereas FIG. 34 shows a screen displayed in setting the inspection range. The upper right portion of the screen of FIG. 33 displays an instruction "enclose the portion to be inspected" and the left portion of the screen displays five options to select for setting the inspection range "box," "oval," "circle," "circumference," and "polygon." In this state, if the operator selects one of these five options (for example "box"), the screen of FIG. 34 is a displayed. On the screen, a box RA of a variable size is depicted. If a cursor CR pointing at box RA is moved by pressing keys 101d to 101g of console 101, box RA can be moved to an arbitrary position in association with the movement of cursor CR. After moving box RA to a desired position, the operator can complete the setting of the inspection range by box RA by performing a determining process with a prescribed operation.

If the inspection range is set, the operation guidance for selecting the inspection method (namely, setting of the image characteristic to be subjected to the set inspection) by performing an interactive process as will later be described.

Figure 35:
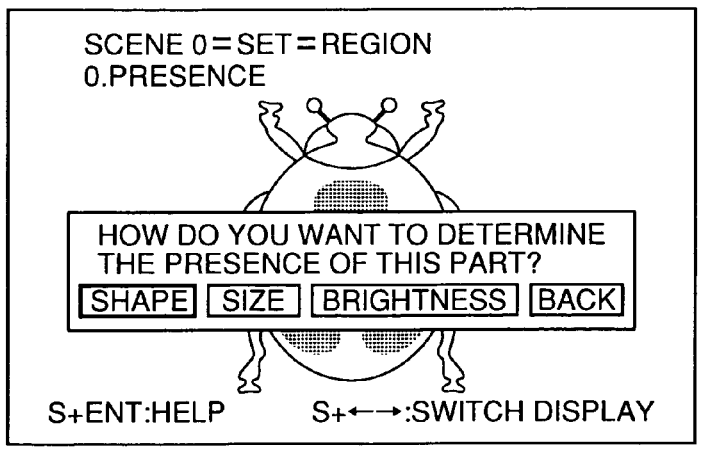
FIG. 35 is a diagram shown in conjunction with a screen for inquiring as to a method of determining presence.

First, the operator receives an inquiry as to the method of the presence determination. FIG. 35 shows a screen for inquiring the method of presence determination. As shown in the drawing, the central portion of the screen displays an inquiry to the operator reading "how do you want to determine the presence of this part?" In addition, below the inquiry, four options to select are displayed as possible answers to the inquiry, i.e., "shape," "size," "brightness," and "back." Further, as in the case of selecting the inspection type, Help request is possible for every option.

Figure 36:
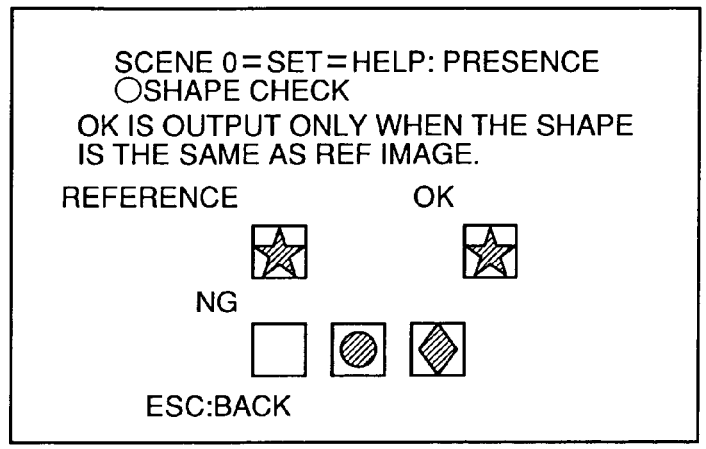
FIGS. 36 to 38 are diagrams shown in conjunction with screens respectively providing definitions of checks for shape, size and brightness.

FIG. 36 shows an exemplary display of the screen when "shape" is designated and Help is called in FIG. 35. In FIG. 36, the upper portion of the screen displays a meaning content of "shape check", reading that "in shape check, OK is output only when the shape is the same as reference image." Approximately the lower half of the screen displays an illustration of the meaning content of "shape check." In this example, several figures corresponding to reference, OK and NG are shown. The figure corresponding to the reference has a star-like shape in a square. The figure corresponding to OK also has a star-like shape in the square. The figure corresponding to NG does not have any figure in the square, or has a circle in the square, or has a rhomboid in the square.

The operator can intuitively understand the meaning content of the shape check by referring to the illustration.

Figure 37:
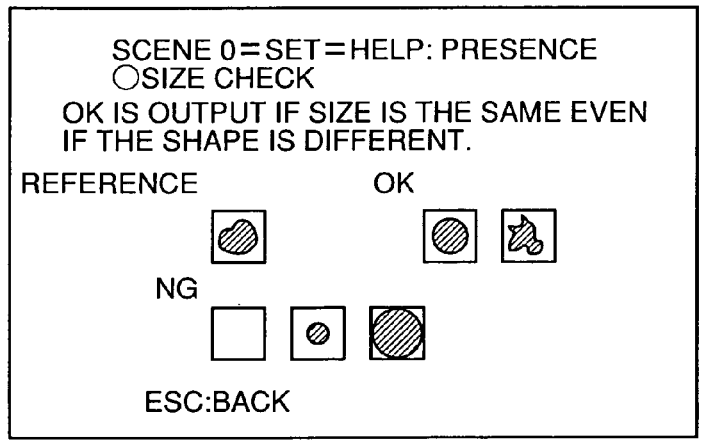

FIG. 37 shows the content of the screen when "size" is designated and Help is called in FIG. 35. As shown in FIG. 37, the upper portion of the screen displays a meaning content of "size check," reading that "in size check, OK is output if size is the same even if the shape is different." Approximately the lower half of the screen displays an illustration of the meaning content of "size check." In this example, several shapes corresponding to reference, OK and NG are shown. The figure corresponding to the reference has an object in a certain shape in the square. The figure corresponding to OK has a figure having approximately the same size as that of the reference, although different in shape. The figure corresponding to NG does not have any shape in the square, or the shape, if any, is considerably smaller or larger in size than that of the reference. The operator can intuitively understand the meaning content of "size check" by referring to the illustration.

Figure 38:
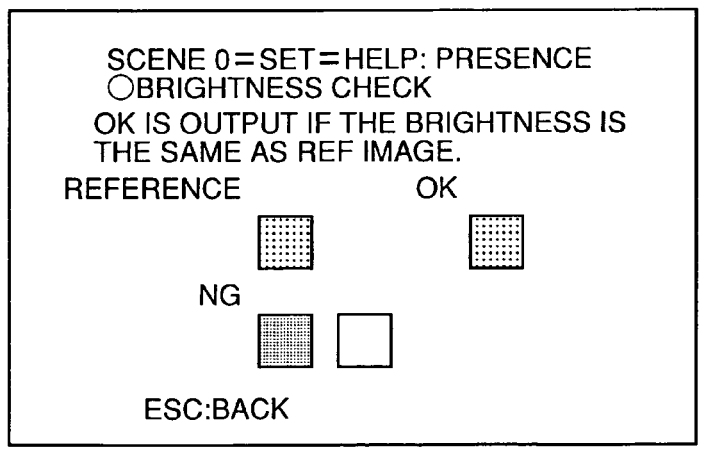

FIG. 38 shows the content of the screen when "brightness" is designated and Help is called in FIG. 35. As shown in FIG. 38, the upper portion of the screen displays a meaning content of "brightness check", reading that "in brightness check, OK is output if the brightness is the same as reference image." Approximately lower half of the same screen displays an illustration of the meaning content of "brightness check." In this example, several figures corresponding to reference, OK and NG are displayed. The figure corresponding to the reference has its internal portion of the square filled with a neutral color. The figure corresponding to OK has its internal portion of the square also filled with the neutral color. The figure corresponding to NG has its internal portion of the square blackened or blanked out. The operator can intuitively understand the meaning content of "brightness check" by referring to the illustration.

Having understood the meaning content of each checking method in accordance with the contents of the screens shown in FIGS. 35 to 38, the operator selects one of these inspection methods. Then, the setting processes for "shape," "size," and "brightness" are executed in accordance with the selected inspection method (a step 3203).

If "shape" is selected as a method of inspecting or checking, first, a setting process of the movement range is performed (a step 3204).

Figure 39:
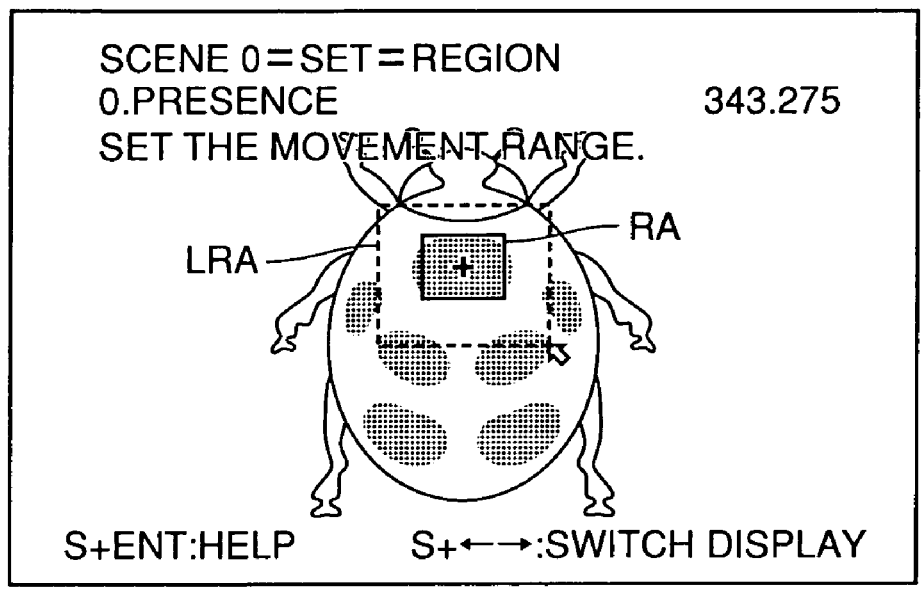
FIG. 39 is a diagram shown in conjunction with a screen for determining a movement range.

FIG. 39 shows a screen for instructing to set the movement range. As shown in FIG. 39, the upper portion of the screen displays an instruction to set the movement range reading that "set movement range." In addition, a box LRA is depicted to define the movement range to enclose a region larger than that including box RA of the inspection range previously determined, in accordance with the prescribed setting operation. Box LRA can be adjusted in size and position by the key operation of console 101. In this state, a prescribed confirming process is performed to end the setting of the movement range.

Then, the internal setting for thickness search measurement is performed (a step 3205), and a preparing process for recognizing the shape in the movement range defined by box LRA is completed.

If "size" is selected for the inspection or check method, the internal setting for two-value area measurement is performed by using a technique such as an automatic binarization process (a step 3206).

If "brightness" is selected for the inspection or check method, internal setting for average thickness measurement is performed (a step 3207).

As described above, the user can simply operate in accordance with the operation guidance of the expert system application, so as to automatically set the image comparing program suitable for the presence inspection.

It is noted that since the internal setting process for the thickness search measurement (step 3205), the internal setting process for the two-value area measurement (step 3206), and the internal setting for the average thickness measurement (step 3207) are known in the field of this type of image processing apparatus, description thereof will not be given here.

Figure 40:
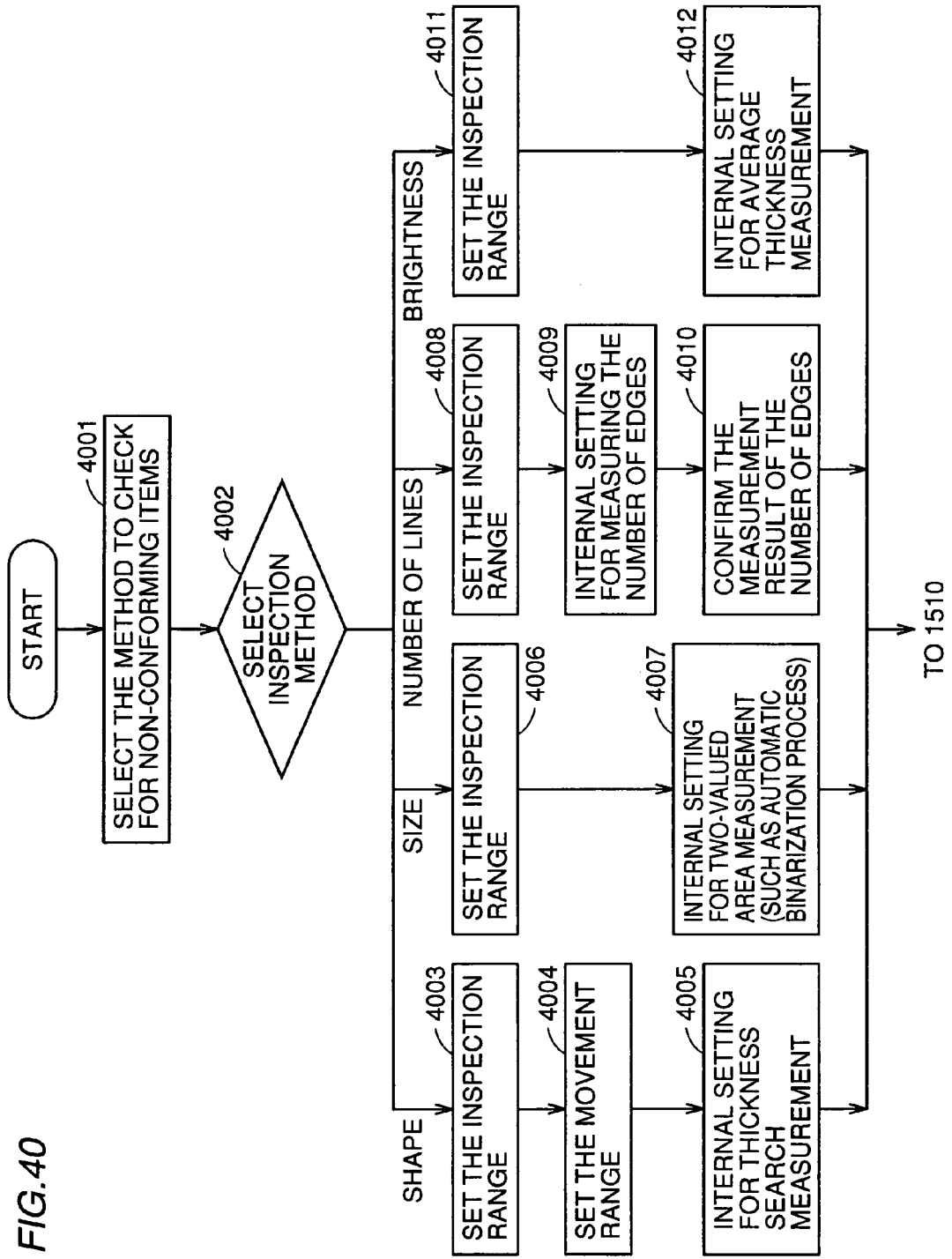
FIG. 40 is a flow chart showing a setting process for conformance inspection.

Now, the setting process for conformance inspection (a step 1504) will be detailed. FIG. 40 is a flow chart showing details of the setting process for the conformance inspection. As shown, at the start of the process, a process of selecting the method for non-conforming items is performed interactively with the screen (a step 4001).

Figure 41:
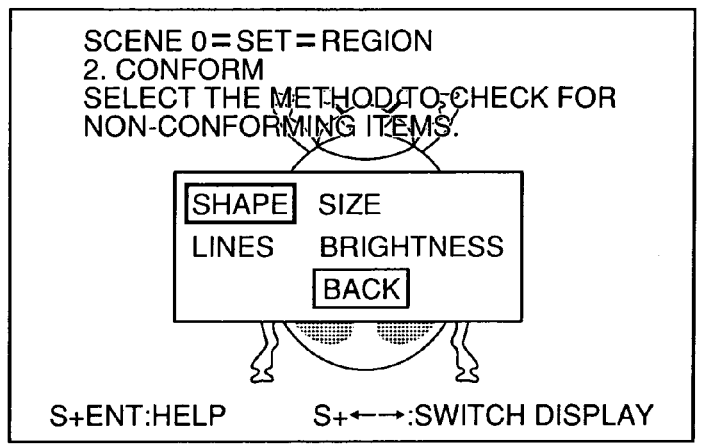
FIG. 41 is a diagram shown in conjunction with a screen instructing to select a method to check for non-conforming items.

Then, FIG. 41 shows a screen for inquiring as to the method of checking non-conforming items. As shown, the upper portion of the screen displays an instruction to select the method for checking non-conforming items, reading that "select the method to check for non-conforming items." The central portion of the screen displays four options to select as possible answers to the inquiry, i.e., "shape" "size," "number of lines," and "brightness." Then, any of these options is selected and Help is called, so that the explanation corresponding to each check method can be given as in the above described case.

Figure 42:
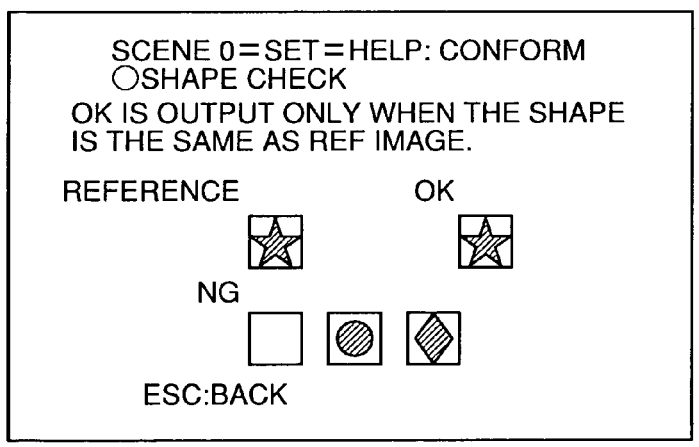
FIGS. 42 to 45 are diagrams shown in conjunction with screens respectively providing definitions of checks for shape, size, the number of lines, and brightness.

The content of the screen when "shape" is selected and Help is called is shown in FIG. 42. As shown, the upper portion of the screen displays a meaning content of "shape check," reading that "in shape check, OK is output only when the shape is the same as reference image." Approximately the lower portion of the screen displays an illustration of the meaning content of "shape check." The content of the illustration is the same as in FIG. 36, and therefore description thereof will not be repeated.

The operator can intuitively understand the meaning content of "shape check" by referring to the illustration.

Figure 43:
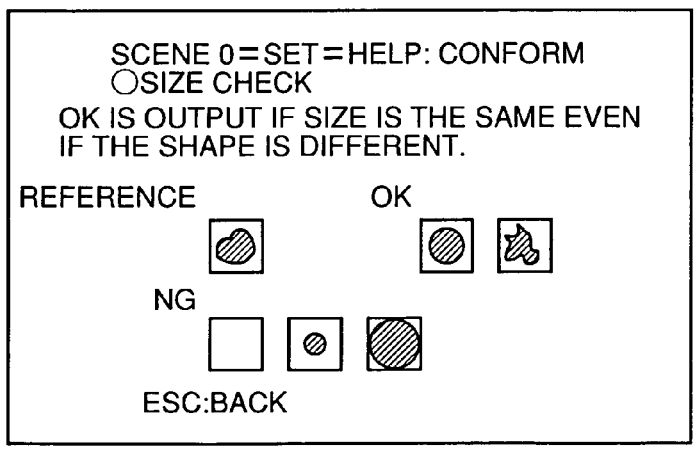

FIG. 43 shows the content of the screen when "size check" is designated and Help is called. As shown, the upper portion of the screen displays a meaning content "size check" reading that "OK is output if size is the same even if the shape is different." Approximately the lower half of the same screen displays an illustration of the meaning content of "size check." The illustration is the same as in FIG. 37 referred to above, and therefore description thereof will not be repeated.

Figure 44:
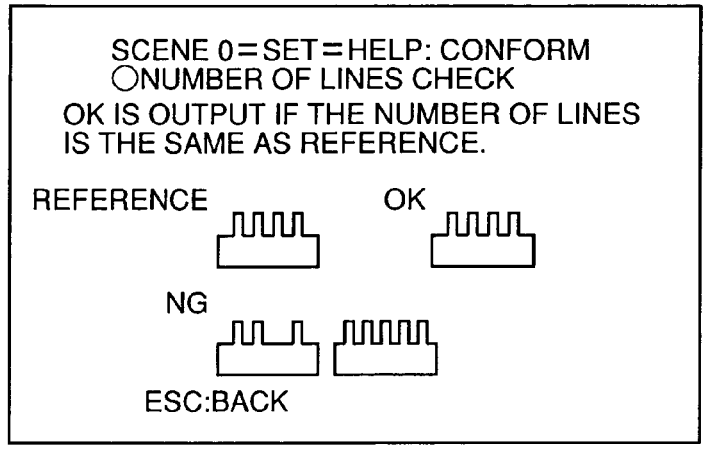

FIG. 44 shows the content of the screen when "number of lines" is designated and Help is called. As shown, the upper portion of the screen displays a meaning content of "number of lines check," reading that "in the number of lines check, OK is output if the number of lines is the same as reference." Approximately the lower half of the same screen displays an illustration of the meaning content of "number of lines check." In this example, several figures corresponding to the reference, OK and NG are displayed. The figure corresponding to the reference has four lines extending from a base portion in parallel with one another. The figure corresponding to OK also has four lines extending from a base portion. Two figures corresponding to NG respectively have three and five lines extending from a base portion in parallel with one another. The operator can intuitively understand the meaning content of "number of lines check" by referring to the illustration.

Figure 45:
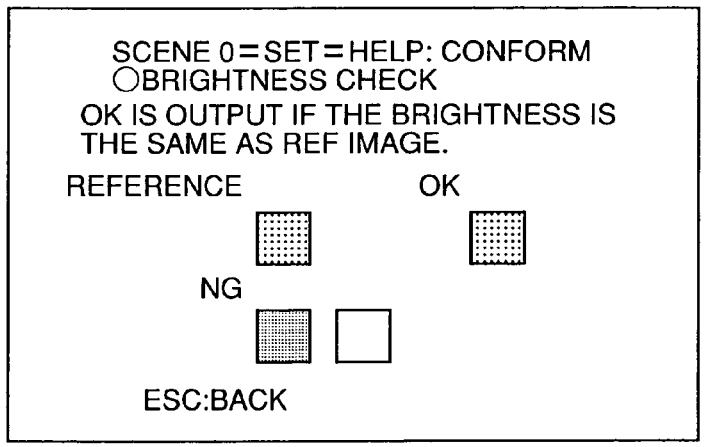

FIG. 45 shows the content of the screen when "brightness" is designated and Help is called. As shown, the upper portion of the screen displays a meaning content "brightness check," reading that "in brightness check, OK is output if the brightness is the same as reference image." Approximately the lower half of the screen displays an illustration of the meaning content of "brightness check." The illustration is the same as in FIG. 38, and therefore description thereof will not be repeated. The operator can intuitively understand the meaning content of "brightness" by referring to the illustration.

Returning to FIG. 40, if the operator has understood the meaning content of each inspection method by referring to Help, the operator performs a prescribed setting operation and determines a method of checking for non-conforming items on the screen shown in FIG. 41.

Then, the setting processes for "shape," "size," "number of lines," and "brightness" are performed according to the selected inspection method (a step 4002).

Figure 46:
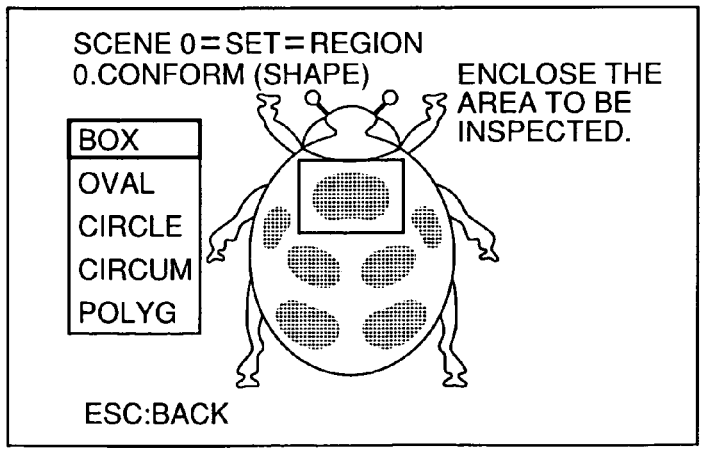
FIG. 46 is a diagram shown in conjunction with a screen for determining the inspection range.

More specifically, if "shape" is selected for the inspection or check method, first, the inspection range setting process is performed (a step 4003). The inspection range setting process (step 4003) is performed interactively with the screens shown in FIGS. 46 and 47. FIG. 46 shows a diagram of a screen for instructing to set the inspection range, whereas FIG. 47 shows a screen in setting the inspection range.

As shown in FIG. 46, the upper portion of the screen for instructing to set the inspection range displays an instruction to set the inspection range reading that "enclose the area to be inspected." The left portion of the screen displays five options to select for setting the shape of the inspection region, i.e., "box," "oval," "circle," "circumference," and "polygon."

Figure 47:
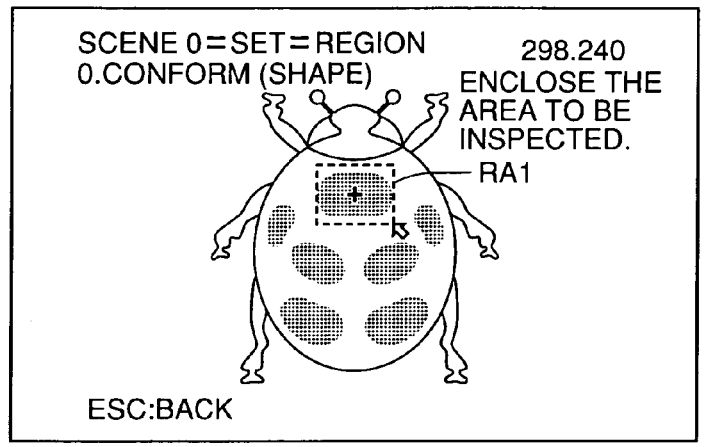
FIG. 47 is a diagram shown in conjunction with a screen in setting the inspection range.

In this state, if the operator selects any of the shapes for the inspection region (in this example, a box), as shown in FIG. 47, a box RA1 defining the inspection range appears on the screen. Box RA1 can be controlled in size and position by the key operation of the console as in the case of the above mentioned box RA. The operator can enclose the portion to be inspected by moving box RA1 on the screen. After a desired inspection region is defined by box RA1, the inspection range setting process is completed by performing a prescribed confirming operation.

Successively, the movement range setting process is performed (a step 4004). The movement range setting process (step 4004) is performed interactively with the screen shown in FIG. 48.

Figure 48:
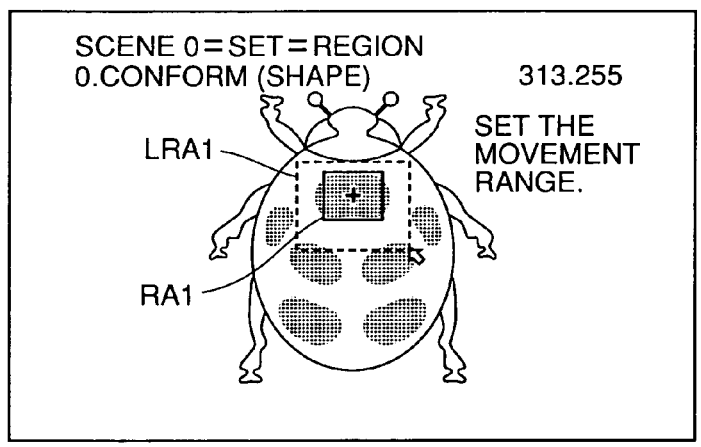
FIG. 48 is a diagram shown in conjunction with a screen for setting the movement range.

The upper portion of the screen of FIG. 48 displays an instruction that "set the movement range." The screen also displays a box LRA1 which is variably controllable in size and position. The operator adjusts the size and position of box LRA1 to enclose box RA1 in the predetermined inspection range by the key operation of control 101 and, thereafter, performs a prescribed confirming operation. Thus, the setting process of the movement range of box RA1 defined by box LAR1 is completed. Then, the internal setting process for the above mentioned thickness search measurement (step 4005) is performed to complete the preliminary process for shape inspection.

Figure 49:
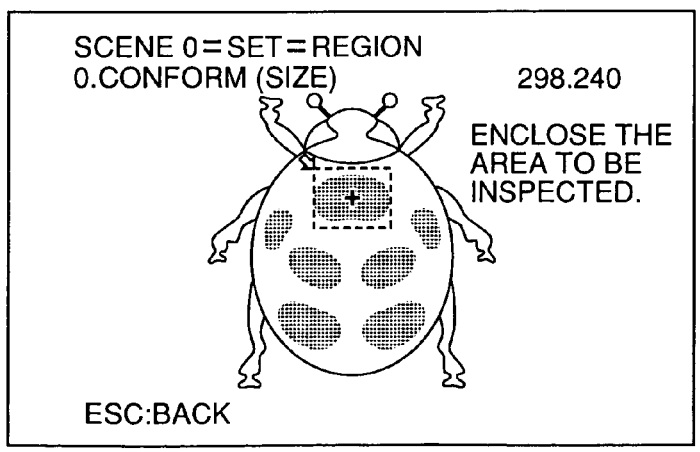
FIGS. 49 and 50 are diagrams shown in conjunction with screens for setting the inspection range.

If "size" is selected for the inspection or check method, the inspection range setting process is performed interactively with the screen shown in FIG. 49 (a step 4006).

Thereafter, as in the above described case, the internal setting process for two-valued area measurement is performed by a technique such as an automatic binarization process to complete the preparation for the size check.

Figure 50:
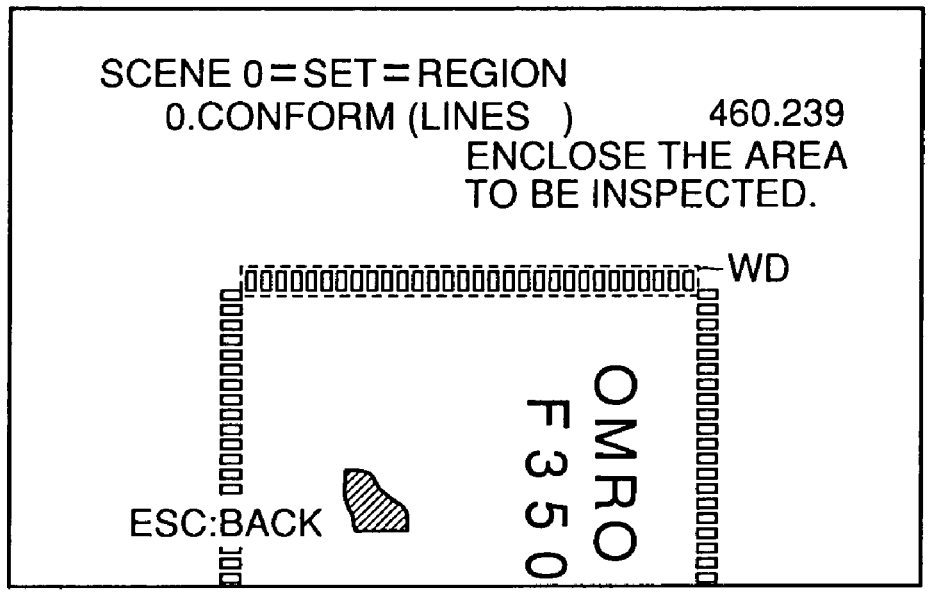

If "number of lines" is selected for the inspection or check method, the inspection range setting process is performed interactively with the screen of FIG. 50 (a step 4008).

As shown in FIG. 50, in this example, an image of the IC package having a plurality of pins protruding from an edge is employed as an image to be inspected. The upper portion of the screen displays a guidance reading "enclose the area to be inspected." The operator encloses a side edge of the IC package, i.e., the portion from which a series of pins are protruding, by using a window WD in an elongate shape. In this state, a prescribed confirming operation is performed to complete the setting of the inspection range.

Thereafter, an internal setting process for edge number measurement is performed (a step 4009). Note that the internal setting process for edge number measurement (step 4009) is known to those skilled in the art, and therefore description thereof will not be given.

Then, a process of checking the edge number measurement as well as measurement result is performed (a step 4010). The checking process (step 4010) is performed interactively with the screen shown in FIG. 51.

Figure 51:
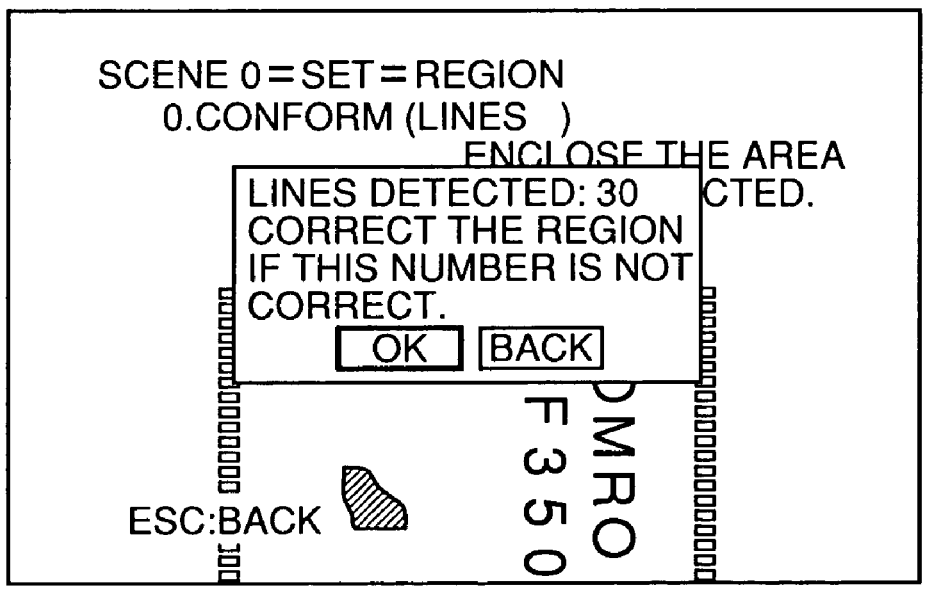
FIG. 51 is a diagram shown in conjunction with a screen for checking a measurement result of the number of edges.

As shown in FIG. 51, the screen displays the edge number measurement result "lines detected: 30" and an instruction to perform necessary compensation reading that "correct the region if this number is not correct." Further, two options to select "OK" and "Back" are displayed therebelow.

The operator selects "OK" to confirm the automatically measured edge number.

As described above, the user can simply operate in accordance with the operation guidance of the expert system application, so that the image comparing program suitable for the conformance inspection is automatically set.

Returning to FIG. 15, a setting process for orientation inspection when "orientation inspection" is selected as the type of inspection (s step 1505) will be described.

Figure 52:
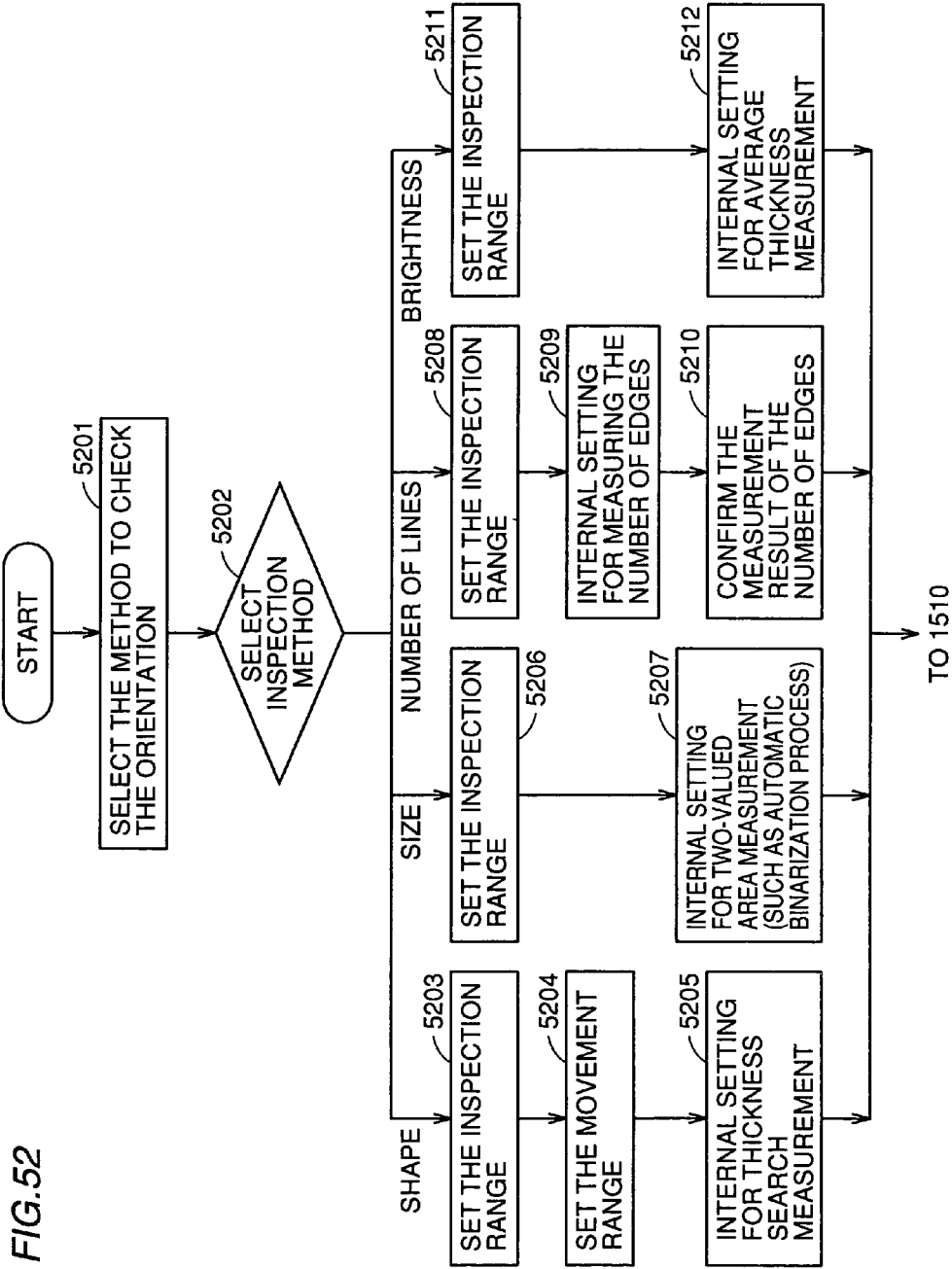
FIG. 52 is a flow chart showing a setting process for orientation inspection.

FIG. 52 shows a flow chart of details of the setting process for orientation inspection. Referring to FIG. 52, at the start of the process, a process of selecting the method for checking orientation or front/back is performed (a step 5201). The process is also performed interactively with the screen as in the case of the above mentioned "conformance inspection."

Then, the processes respectively corresponding to inspection methods "shape" "size," "number of lines," and "brightness" are performed in accordance with the selected inspection method (a step 5202).

Namely, if "shape" is selected for the inspection method, as in the case of "conformance inspection," the inspection range setting process (a step 5203), movement range setting process (a step 5204) and internal setting process for thickness search measurement (a step 5205) are sequentially performed.

If "size" is selected for the inspection method, as in the case of the "conformance inspection," the inspection range setting process (a step 5206), the internal setting process for two-valued area measurement by automatic binarization process (a step 5207) and the like are sequentially performed.

If "number of lines" is selected for the inspection method, as in the case of the above described "conformance inspection," the inspection range setting process (a step 5208), the internal setting process for edge number measurement (a step 5209), and a confirming process for the edge number measurement result (a step 5210) are sequentially performed.

If "brightness" is selected for the inspection method, as in the case of the above described "conformance inspection," the inspection range setting process (a step 5211) and the internal setting process for average density measurement (a step 5212) are sequentially performed.

Figure 53:
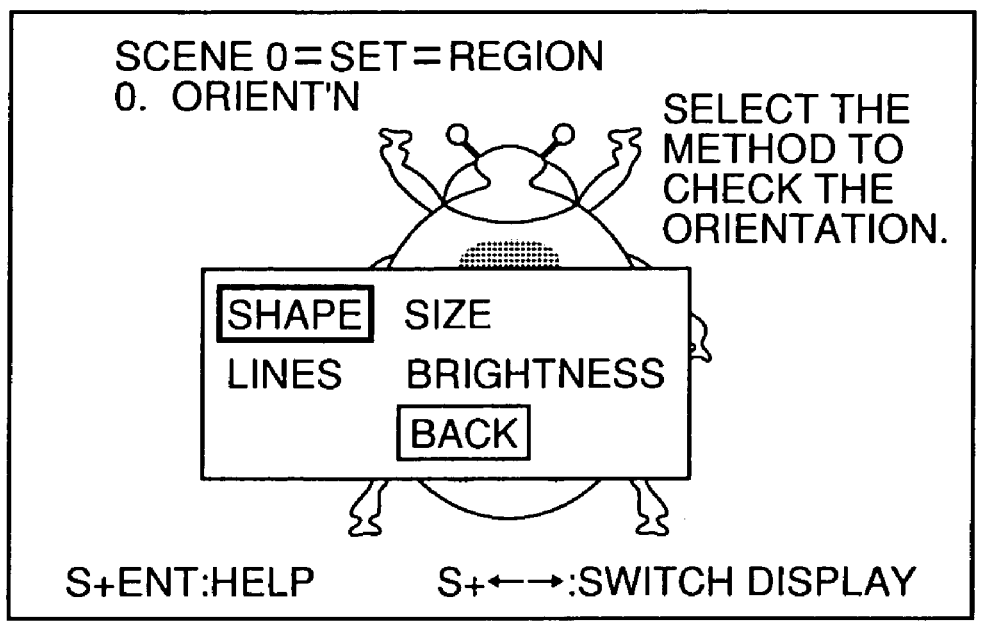
FIG. 53 is a diagram shown in conjunction with a screen inquiring as to a method of checking direction or front/back.

FIG. 53 shows the screen for inspecting to select the orientation or front/back check method.

As described above, the user can simply operate in accordance with the operation guidance of the expert system application, so that the image comparing program suitable for the orientation front/back inspection can be automatically set.

Figure 54:
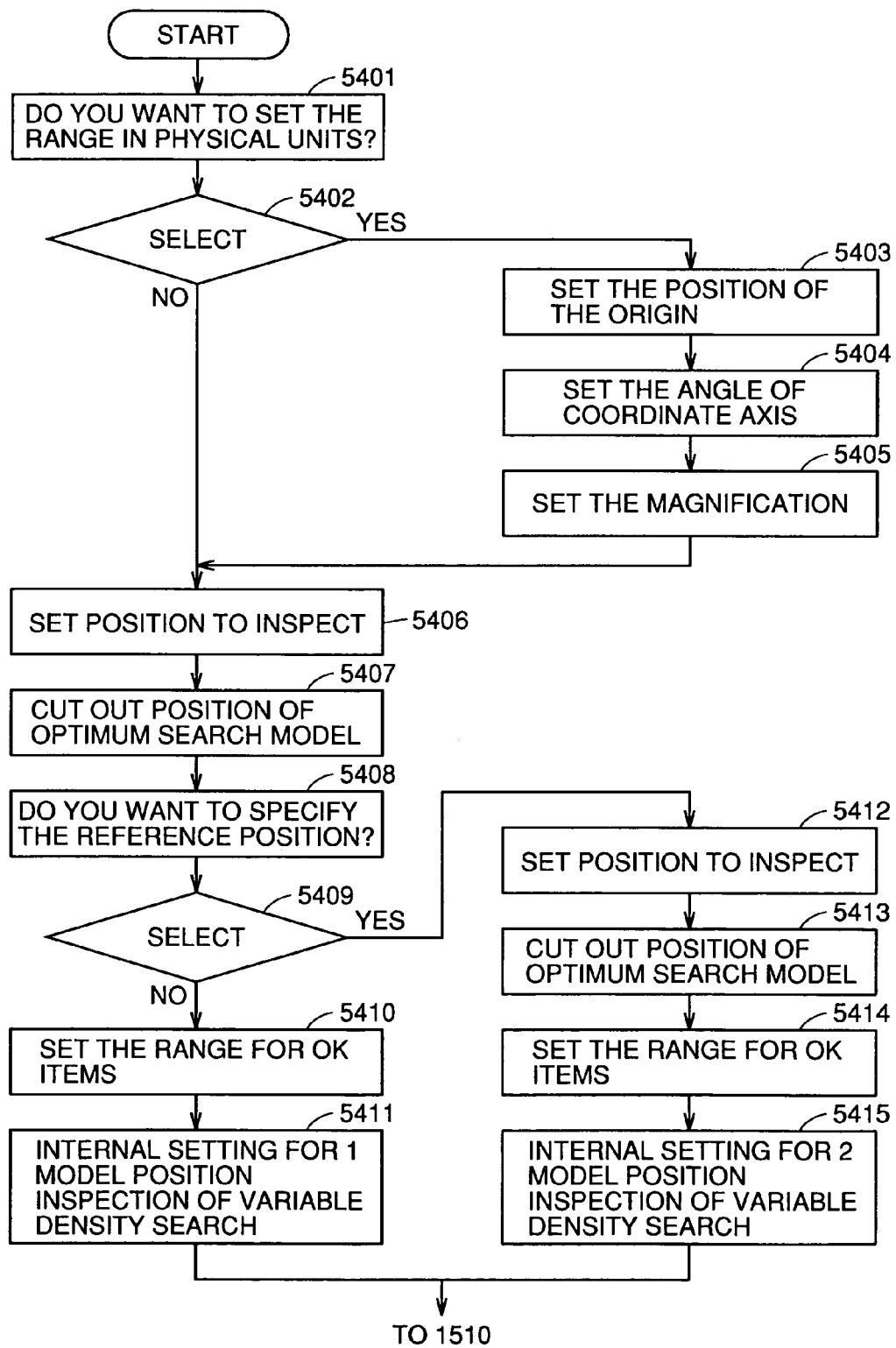
FIG. 54 is a flow chart showing a setting process for position inspection.

Returning to FIG. 15, the setting process for position inspection (a step 1506) when "position inspection" is selected for the type of inspection (a step 1502) will be described. FIG. 54 shows a detailed flow chart showing a setting process for the position inspection. Referring to FIG. 54, at the start of the process, a dimension setting process for determining the range for OK items (a step 5401) is performed. In setting the range for OK items, a determination is made as to if an amount of displacement in position of product 502 is in the range for OK items. The dimension setting process is performed interactively with the screen.

Figure 55:
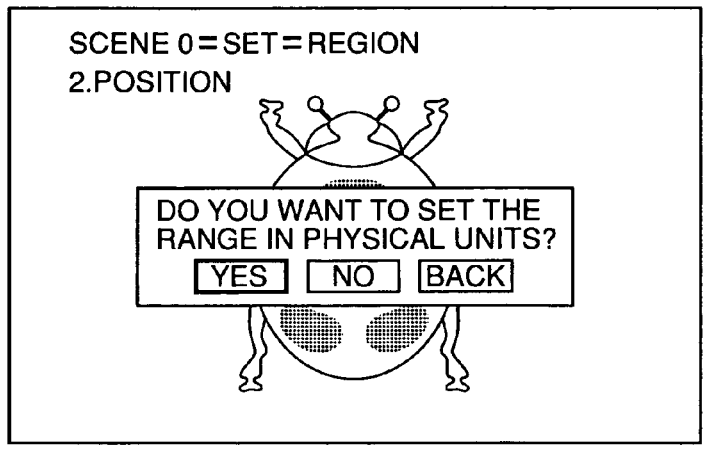
FIG. 55 is a diagram shown in conjunction with a screen inquiring as to if the range for non-defective (OK) items is set in physical units.

FIG. 55 shows a screen for inquiring as to if the range for OK items is to be set in physical units. As shown, the central portion of the screen displays an inquiry reading that "do you want to set the range in physical units." At the time, three options to select "yes" "no," and "back" as possible answers to the inquiry are displayed therebelow. The operator selects one of the options and performs a prescribed confirming process.

Here, if the range is set in physical units (yes in step 5402), a process of setting origin of coordinate (step 5403) is performed.

Figure 56:
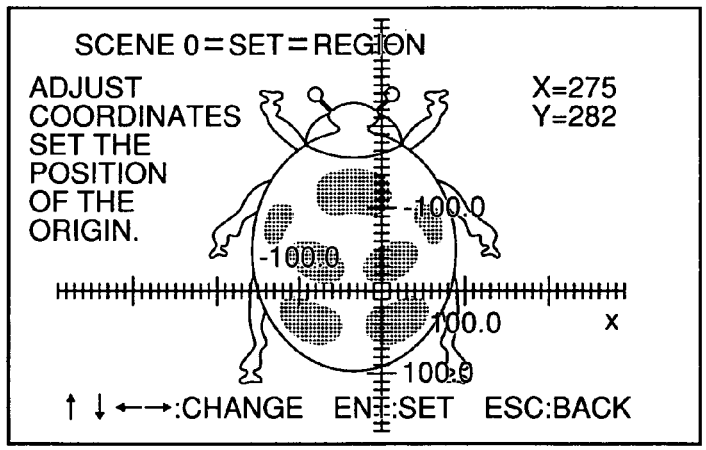
FIG. 56 is a diagram shown in conjunction with a screen instructing to set the position of origin.

FIG. 56 shows a screen for instructing to set the origin of coordinate axis. As shown, the left portion of the screen displays an instruction "set the positions for alignment and coordinate origin." The screen shows X and Y coordinate axes. The X and Y coordinate axes can be moved in any direction by the key operation of console 101. The operator can move the coordinate axis to achieve a desired origin position and performs a prescribed confirming operation to complete the setting of the coordinate origin position.

Then, an angle of coordinate setting process (step 5404) is performed). The angle of coordinate setting process (step 5404) is also performed interactively with the screen.

Figure 57:
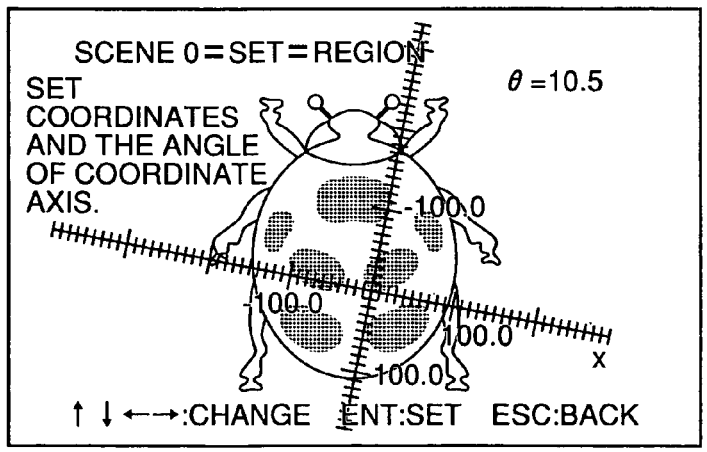
FIG. 57 is a diagram shown in conjunction with a screen instructing to set the angle of coordinate axis.

FIG. 57 shows a screen for setting the angle of coordinate. As shown, the left portion of the screen displays an instruction to set the angle of coordinate reading that "set the coordinates and the angle of coordinate." The screen also shows X and Y coordinate axes. The X and Y coordinate axes can be rotated by a prescribed angle by the key operation of console 101. The operator can perform a prescribed confirming operation with the coordinate axis angled by a desired angle to complete the angle of coordinate setting process.

Thereafter, a magnification setting process (a step 5405) is performed. The magnification setting process (step 5405) is also performed interactively with the screen.

Figure 58:
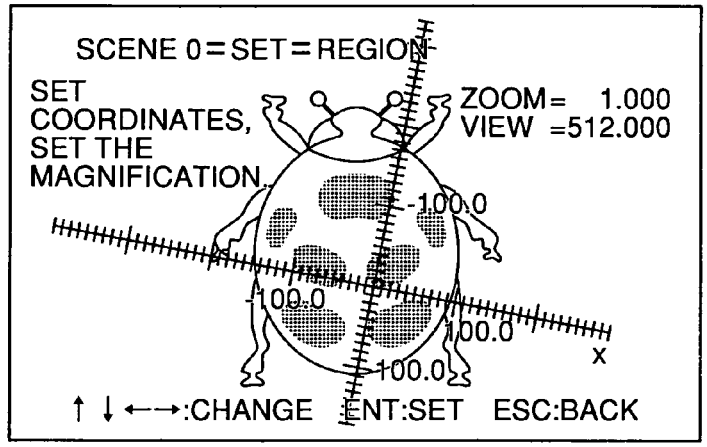
FIG. 58 is a diagram shown in conjunction with a screen instructing to set a magnification.

FIG. 58 shows a screen for instructing to set the magnification. As shown, the left portion of the screen displays an instruction to set the magnification reading that "set coordinates, set the magnification." The screen also displays numerical values of a zoom and view. These numerical values can be arbitrarily changed by the key operation of console 101.

The operator can set these numerical values to desired values and complete the setting of the magnification.

After setting the origin of coordinate, angle of coordinate and magnification, a process of setting an inspection position is performed (a step 5406). The inspection position setting process is also performed interactively with the screen.

Figure 59:
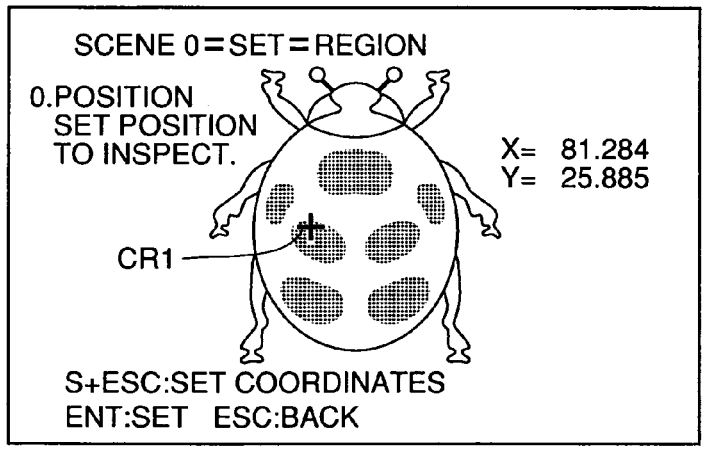
FIGS. 59 to 62 are diagrams shown in conjunction with screens respectively instructing to set inspection position, reference position, range for OK items, and reference position.

FIG. 59 shows a screen for instructing to set the inspection position. As shown, the upper left screen displays an instruction to set the inspection position reaching that "set position to inspect." The screen also displays a cursor CR1 indicating the inspection position. The operator can complete the setting of the inspection position by performing a confirming operation with cursor CR1 properly positioned by the key operation of console 101.

After the inspection position is set, a process of cutting an optimum search model is performed by a known method (a step 5407). This type of cutting process is conventionally known, and therefore description thereof will not be given here.

Successively, a process of setting a reference position is performed (a step 5408). The reference position setting process (step 5408) is also performed interactively with the screen.

Figure 60:
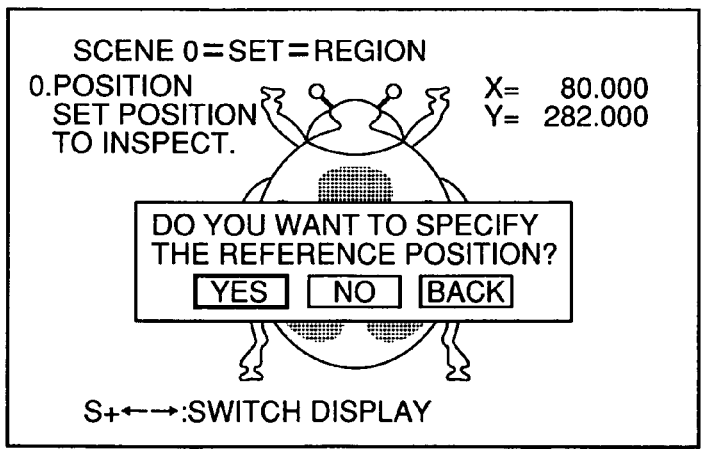

FIG. 60 shows a screen for instructing to set the reference position. As shown, the upper left portion of the screen displays an instruction to set the reference position reading that "set position to inspect." The central portion of the screen displays an inquiry "do you set a reference position?" and three options to select as possible answers "yes," "no," and "back." The operator selects one of the options and performs a prescribed confirming operation, so that the setting of the reference position is, or not to be performed.

Here, if the setting of the reference position is selected ("yes" in step 5409), the reference position setting process (a step 5412), position cutting process for optimum search model (step 5413), OK item range setting process (step 5404), and internal setting process for 2 model position inspection by variable density search (step 5415) are sequentially performed by a known method.

On the other hand, if the setting of the reference position is not to be performed ("no" in step 5409), the OK item range setting process (step 5410) is performed interactively with the screen.

Figure 61:
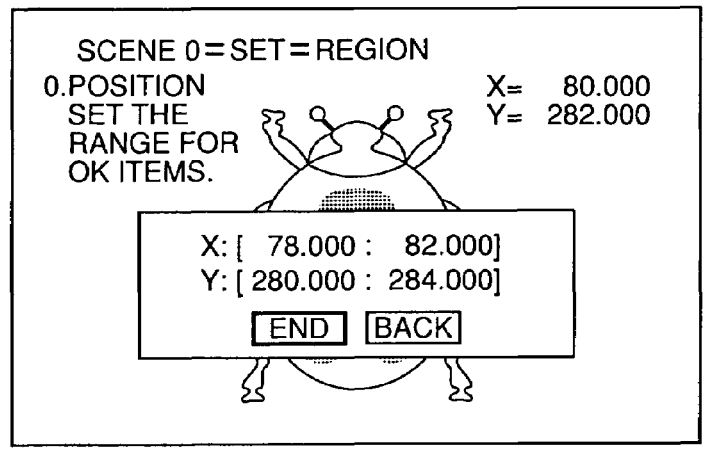

FIG. 61 shows a screen for instructing to set the OK item range. As shown in FIG. 61, the upper left portion of the screen displays an instruction to set the OK item range reading that "set the range for OK items." The central portion of the screen displays X and Y values defining the OK item range, along with two options to select "end" and "back" therebelow.

The operator can set X and Y by the key operation of console 101 and, then selects "end" for the confirming operation, whereby the setting of the OK item range can easily be performed.

Thereafter, an internal setting process for 1 model position inspection by variable density search (a step 5411) is performed by a known method.

Figure 62:
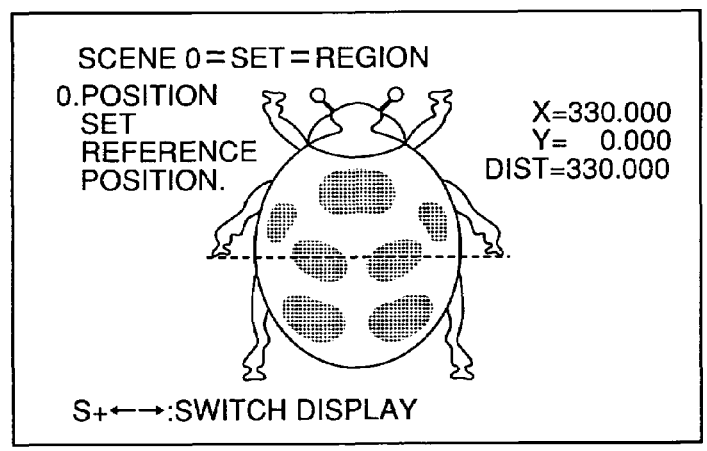

FIG. 62 shows a screen for instructing to set the reference position. As shown, the upper left portion of the screen displays an instruction to set the reference position reading that "set reference position." The central portion of the screen displays a dotted line for the reference position. By aligning the line with the reference position, the operator can easily set the reference position.

Figure 63:
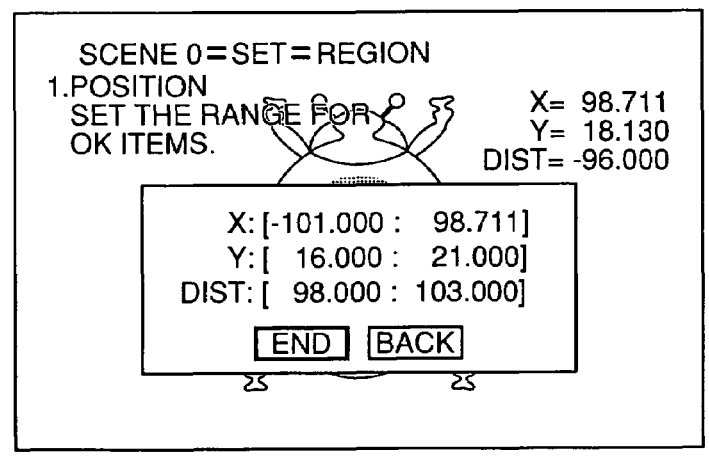
FIG. 63 is a diagram shown in conjunction with a screen instructing to set the range for OK items.

FIG. 63 shows a screen for instructing to set the OK item range. As shown, the upper left portion of the screen displays an instruction to set the OK item range reading that "set the range for OK items." The central portion of the screen displays X and Y values corresponding to the distances along X and Y axes of the OK item range as well as a distance therebetween. Further, two options to select, i.e., "end" and "back" are displayed therebelow.

After setting X and Y and the distance therebetween to desired values by the key operation of console 101, "end" is selected and prescribed confirming operation is performed, so that the setting of the OK item range can simply be performed.

As described above, the user can simply operate in accordance with the operation guidance of the expert system application, so that the image comparing process suitable for the position inspection can automatically be set.

Figure 64:
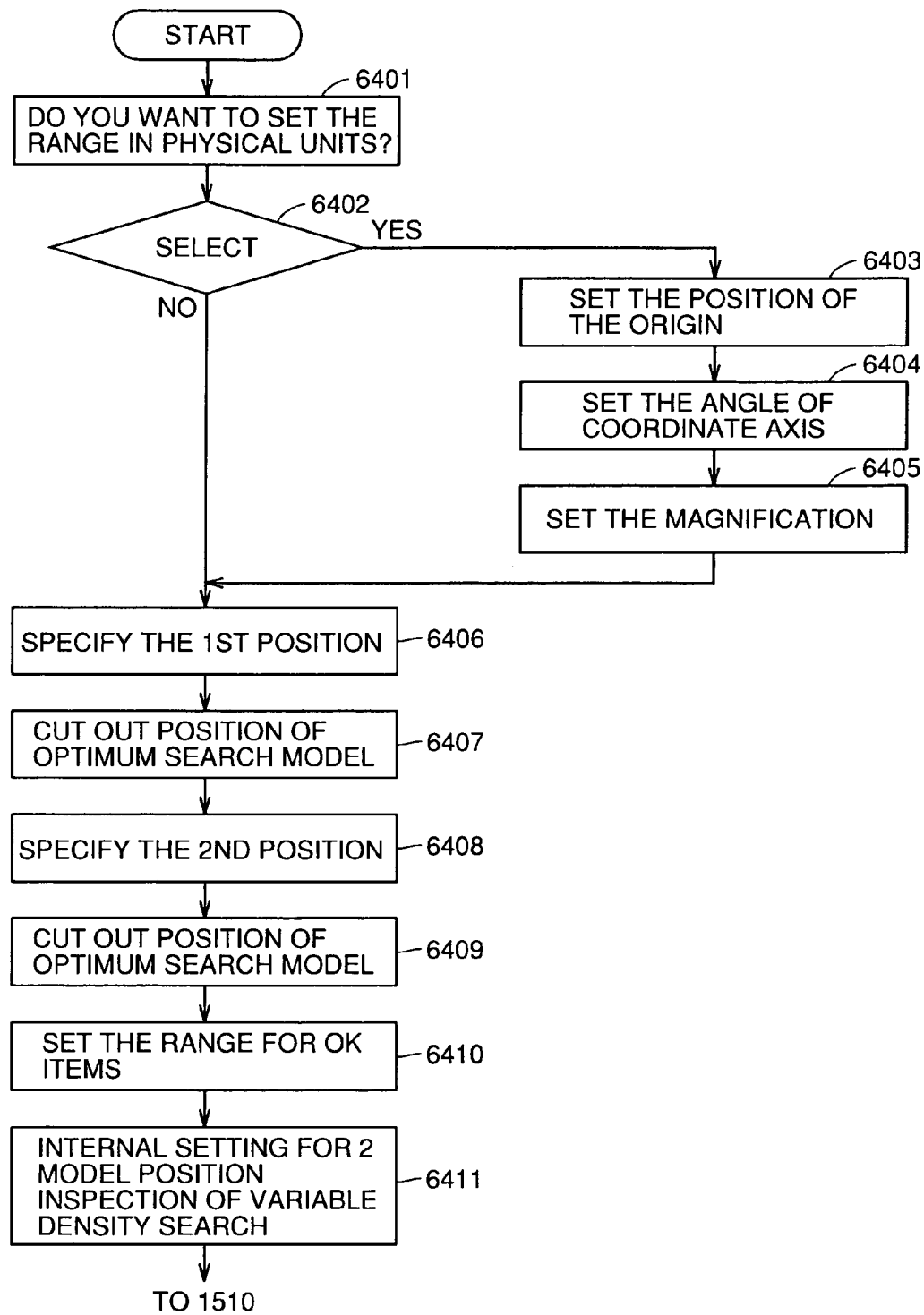
FIG. 64 is a flow chart showing a setting process for dimension inspection.

Returning to FIG. 15, the setting process when "dimension inspection" is selected (step 1507) will be detailed. FIG. 64 is a flow chart showing in detail the setting process for dimension inspection. In FIG. 64, at the start of the process, a dimension setting process in determining the OK item range is performed (a step 6601). The dimension setting process (step 6601) is performed interactively with the screen as in the case of the above described "position inspection."

If the setting in physical units is selected ("yes" in step 6402), the coordinate origin position setting process (step 6403), angle of coordinate setting process (step 6404) and magnification setting process (step 6405) are sequentially performed as in the case of the above described "position inspection."

Then, a process of setting the first position for dimension inspection is performed (a step 6406). The setting process is performed interactively with the screen.

Figure 65:
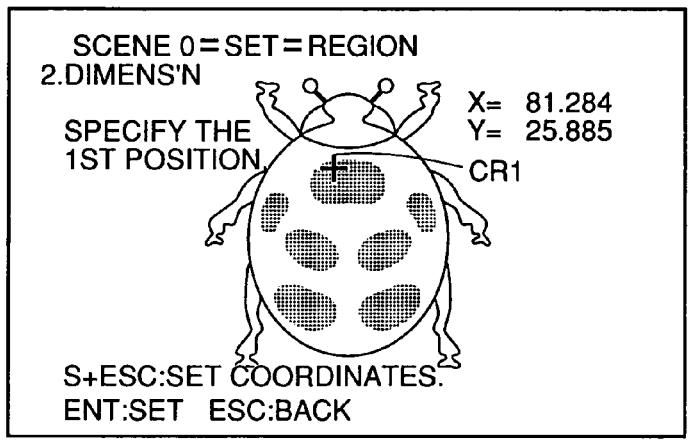
FIGS. 65 and 66 are diagrams shown in conjunction with screens respectively instructing to set the first and second positions.

FIG. 65 shows a screen for instructing to set the first position. As shown, the upper left portion of the screen displays an instruction to set the first position reading that "specify the first position." The screen also displays a cursor CR1 for setting the position with use of a symbol +. The operator moves cursor CR1 to a desired position and then performs a prescribed confirming operation, so that the setting of the first position can be completed.

Then, a cutting process for an optimum search model is performed (step 6407) by a known method. This type of search model cutting process is known from various documents, and therefore description thereof will not be given here.

Successively, a process specifying the second position for dimension inspection is performed (a step 6408). This position setting process is also performed interactively with the screen.

Figure 66:
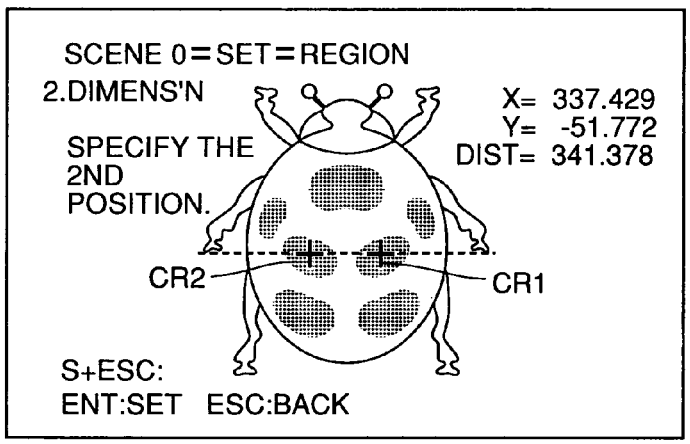

FIG. 66 shows a screen for instructing to set the second position. As shown, the upper left portion of the screen displays an instruction to set the second position reading that "specify the second position." At the same time, the screen also displays cursor CR2 for designating the second position. The operator moves cursor CR2 by the key operation of console 101 and then performs a prescribed confirming operation, so that the setting of the second position can be completed.

Then, a position cutting process for a search model is performed by a known method (a step 6409).

Thereafter, a process of setting the OK item range (a step 6410) is performed. The OK item range setting process (step 6410) is performed interactively with the screen.

Figure 67:
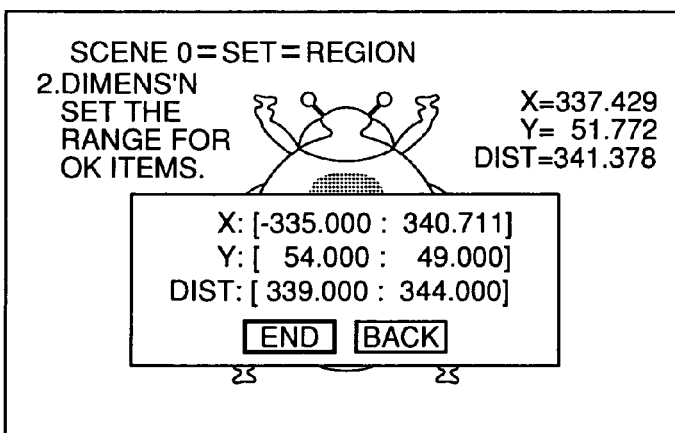
FIG. 67 is a diagram shown in conjunction with a screen instructing to set the range for OK items.

FIG. 67 shows a screen for instructing to set the OK item range. As shown, the upper left portion of the screen displays an instruction to set the OK item range reading that "set the range for OK items". The upper right portion of the screen displays numerical values of X and Y as well as a distance, which define the current OK item range.

The central portion of the screen displays numerical values of X and Y and distance to be changed as well as two options select "end" and "back" therebelow.

The operator changes the numerical values of the central X and Y and distance by the key operation of console 101 and selects "end" for confirmation, so that the OK item range can simply be set.

Thereafter, an internal setting process for 2 model position inspection by thickness search is performed by a known method (a step 6411).

As described above, the user can simply operate in accordance with the operation guidance of the expert system application, so that the image comparing program suitable for the dimension inspection can be automatically set.

Figure 68:
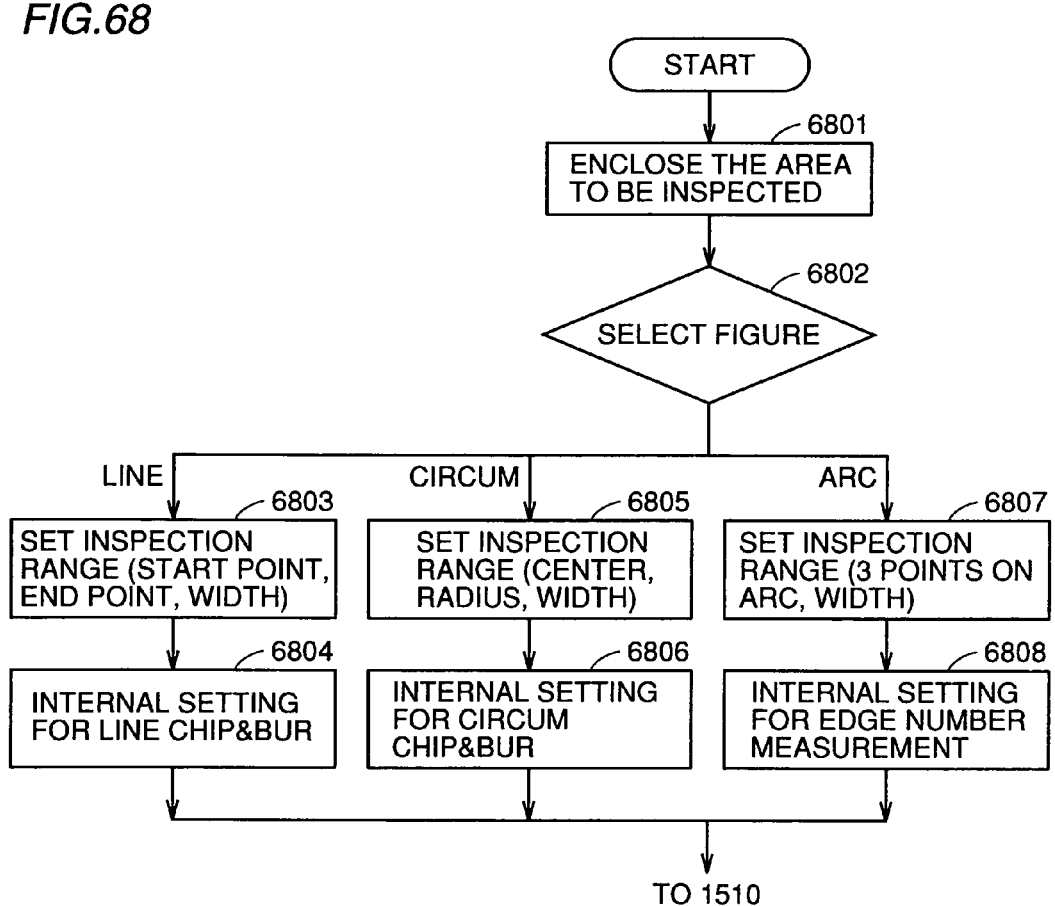
FIG. 68 is a flow chart showing a setting process for chip and burr inspection.

Next, returning to FIG. 15, a setting process (a step 1508) when "chip and burr" is selected for the type of inspection will be detailed. FIG. 68 is a flow chart showing details of the setting process for chip and burr inspection.

Figure 69:
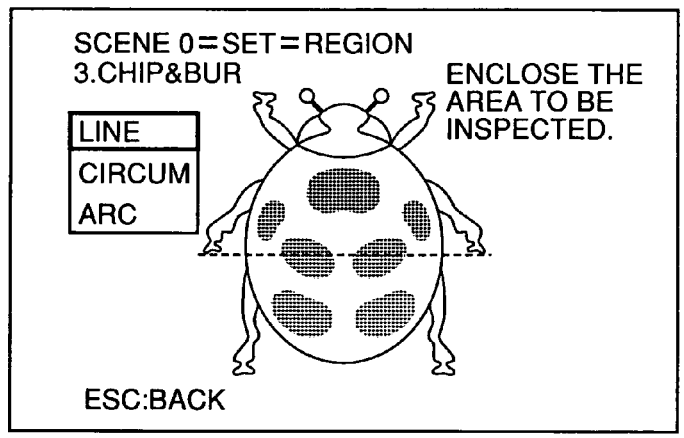
FIGS. 69 and 70 are diagrams shown in conjunction with screens instructing to set the inspection range.

When the process is started in FIG. 68, a process of setting the inspection region is performed (a step 6801). The inspection range setting process is also performed interactively with the screen. FIG. 69 shows a screen for instructing to set the inspection range. As shown in FIG. 69, the upper right portion of the screen displays an instruction to set the inspection range reading that "enclose an area to be inspected." The upper left portion of the screen displays three options to select as lines used for enclosing the inspection region, i.e., "line," "circumference," and "arc."

In this state, if one of the options "line," circumference," and "arc" is selected (a step 6802), the inspection range setting process is performed in accordance with the selected content (steps 6803, 6804, 6807).

Figure 70:
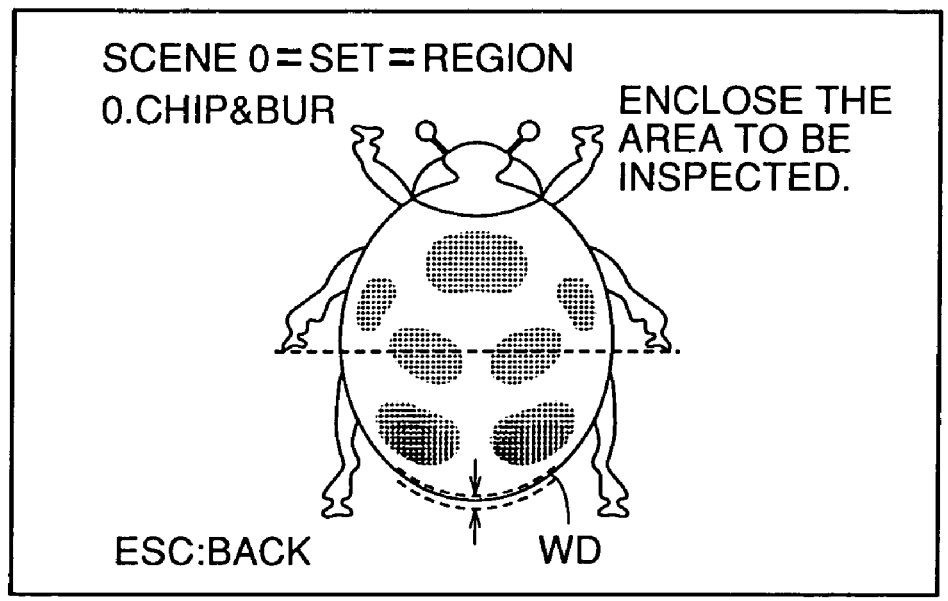

FIG. 70 shows a screen in setting the inspection range when "arc" is designated. As shown in FIG. 70, the upper right portion of the screen displays an instruction to set the inspection range reading that "enclose the area to be inspected." The screen also shows an arc like cutting window WD with a prescribed length formed by two arcs in parallel with each other and indicated by arrows. The operator can set the inspection range for chip and burr inspection at the edge of a tail of the ladybird, for example, by aligning the arc like window WD with the tail of the ladybird. It is noted that the arc like inspection range is set by specifying three points on the arc and its length.

As shown in the flow chart of FIG. 68, the inspection range is set by setting "start point," "end point," and "length" when "line" is selected. Similarly, when "circumference" is selected, the inspection range is set by setting "center," "radius," and "length."

Thereafter, after the setting the inspection range for "line," "circumference" and "arc," (steps 6803, 6805, 6807), the internal setting process for corresponding chip and burr inspection is performed (steps 6804, 6806, 6808).

Since these internal setting processes (steps 6804, 6806, 6808) are known from various documents, description thereof will not be given here.

As described above, the user can simply perform the operation in accordance with the operation guidance of the expert system application, so that the image comparing program suitable for the chip and burr inspection can automatically be performed.

Figure 71:
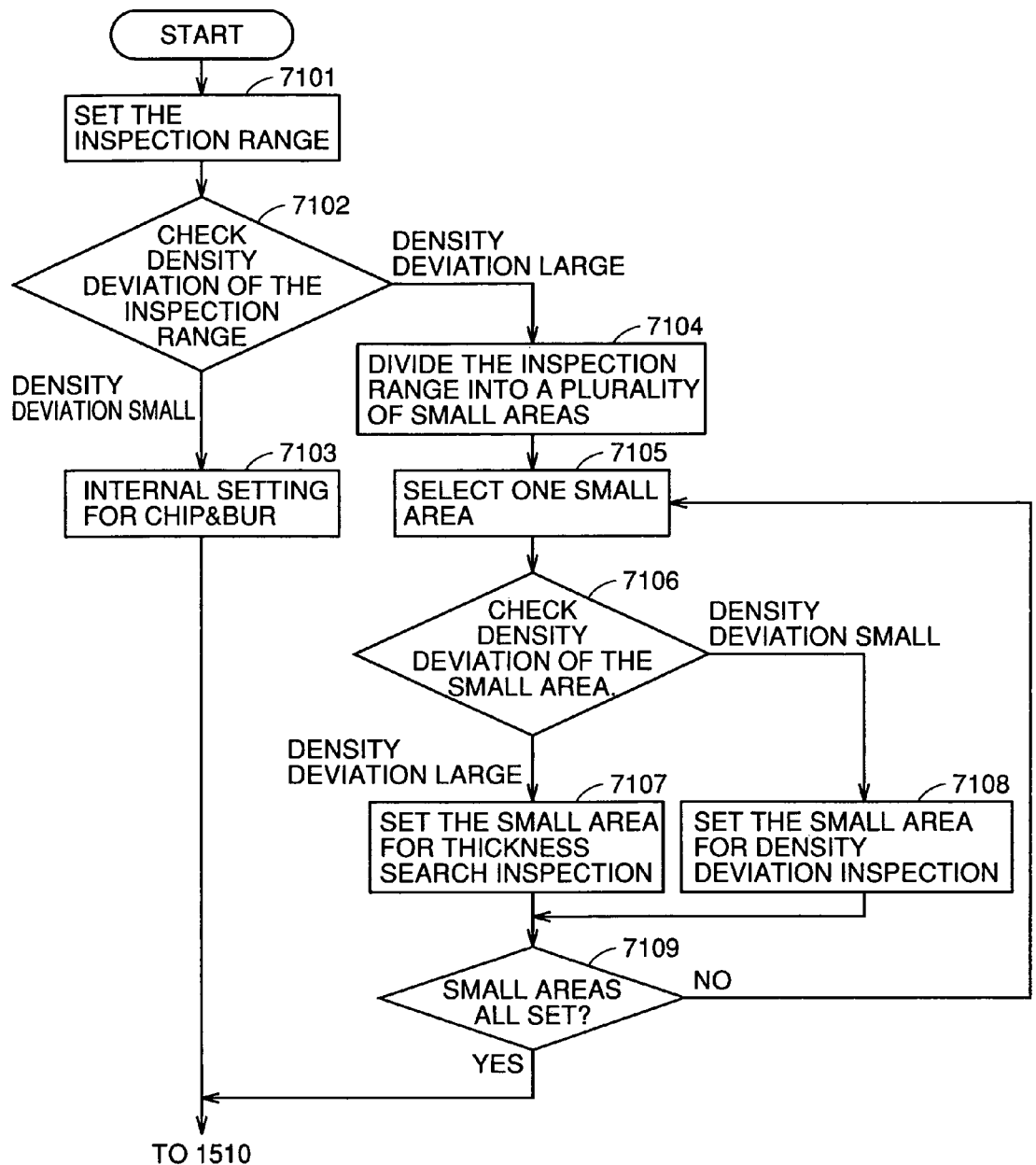
FIG. 71 is a flow chart showing a setting process for surface defect inspection.

Then, returning to FIG. 15, the setting process (step 1509) will be detailed when "surface defect inspection" is selected for the type of inspection (step 1502). FIG. 71 is a flow chart showing details of the setting process for the surface defect inspection.

Figure 72:
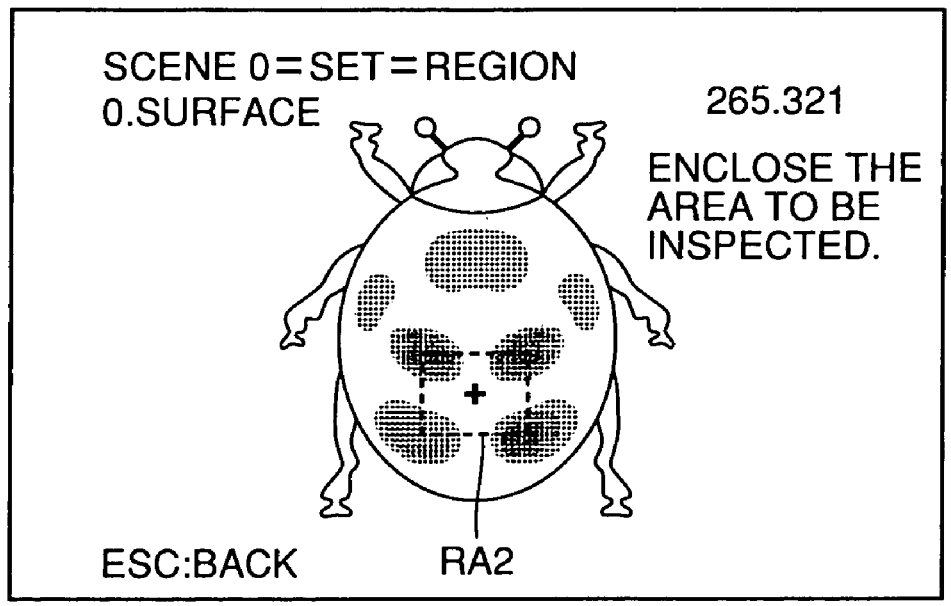
FIG. 72 is a diagram shown in conjunction with a screen instructing to set the inspection range.

At the start of the process of FIG. 71, first, the inspection range setting process (a step 7101) is performed interactively with the screen. The screen for instructing to set the inspection range is shown in FIG. 72. As shown, the upper right portion of the screen displays an instruction to set the inspection range reading that "enclose the area to be inspected." The screen also shows a square or box RA2 enclosing the range to be inspected. The size and position of this figure RA2 can be arbitrarily adjusted by the key operation of console 101. Thus, the operator can change the size and position of FIG. RA2 by the key operation of console 101 for determining the desired inspection range.

Thereafter, a density deviation of the inspection range is checked (a step 7102). Here, if it is determined that the density deviation is smaller than a given value ("density deviation small" in a step 7102), successively, an internal setting for the chip and burr inspection is performed on the inspection range (a step 7103).

On the other hand, if it is determined that the density deviation is greater than the given value ("density deviation large" in step 7102), the inspection range is divided into a plurality of small areas (a step 7104).

Then, the small areas are sequentially selected (a step 7105), on which the density deviation determination is performed (a step 7106). If the density deviation is large ("density deviation large" in step 7106), the small area is set for the thickness search inspection (a step 7107). On the other hand, if it is determined that the selected small area has density deviation smaller than the given value ("density deviation small" in step 7106), the small area is set for density deviation inspection (a step 7108). Then, the above described operation is repeated for every small area (a step 7109).

This enables the presence inspection for surface defects within the inspection range.

As described above, the user can simply perform the operation in accordance with the operation guidance of the expert system application, so that the image comparing program suitable for the surface defect inspection can automatically be set.

Figure 73:
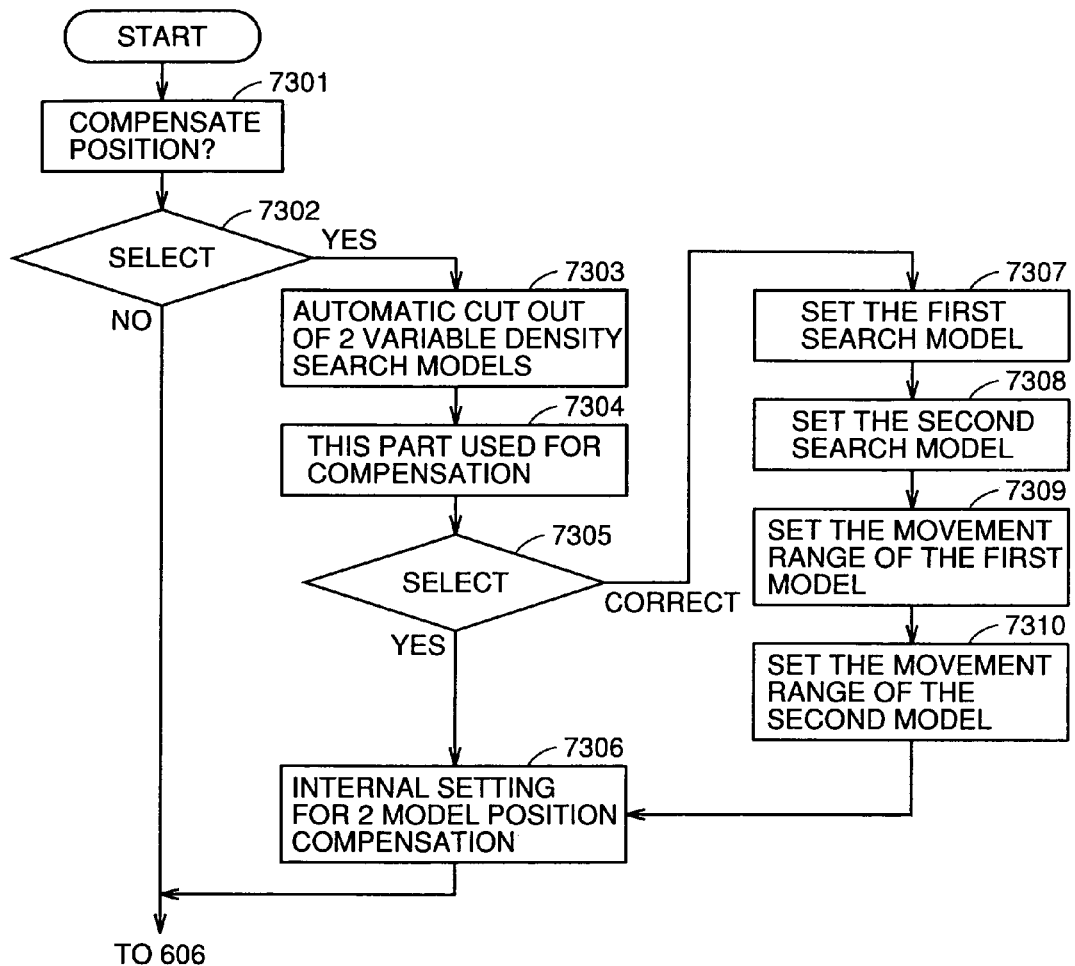
FIG. 73 is a flow chart showing a setting process for position compensation.

Returning to FIG. 6, a position compensation process (a step 605) will be detailed. FIG. 73 is a flow chart showing details of the setting process for position compensation.

In FIG. 73, at the start of the process, it is determined if position compensation is to be performed (a step 7301). The process is also performed interactively with the screen.

Figure 74:
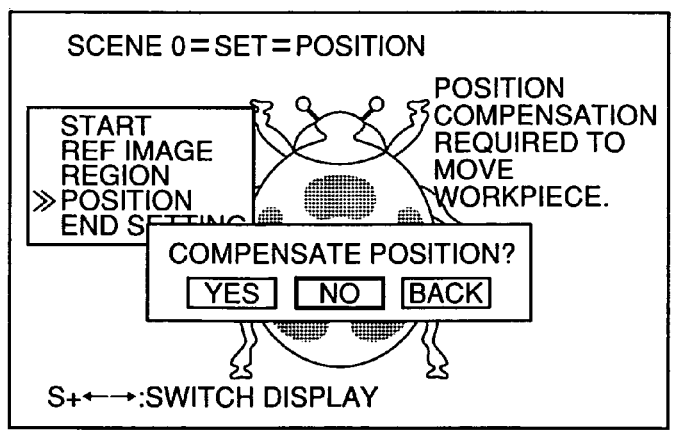
FIG. 74 is a diagram shown in conjunction with a screen for inquiring as to if position compensation is to be performed.

FIG. 74 shows a screen for inquiring as to if the position compensation is to be performed. As shown in FIG. 74, the upper right portion of the screen displays a guidance reading that "position compensation required to move workpiece." The central portion of the screen displays, in addition to an inquiry "position compensation required?" three options for the answer "yes," "no" and "back." The operator selects one of these options by the key operation of console 101, so that it is determined if the position compensation is to be performed or not.

In this state, if "yes" is selected ("yes" in a step 7302), an automatic cutting process for two variable density search models is performed (a step 7303). Then, it is confirmed as to if these portions are to be used for position compensation (a step 7304). The confirming process (step 7304) is performed interactively with the screen.

Figure 75:
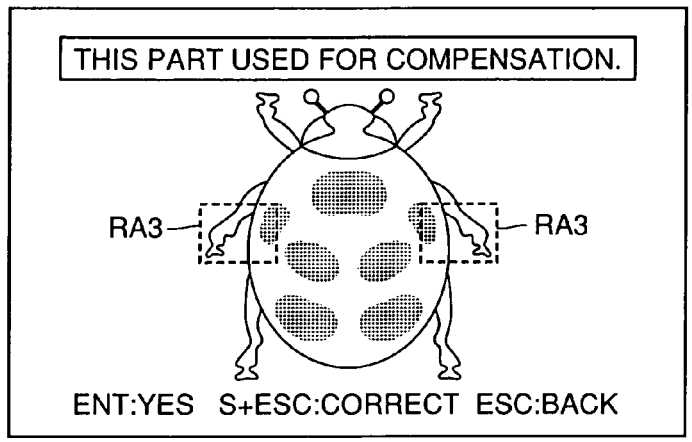
FIG. 75 is a diagram shown in conjunction with a screen for confirming a portion used for the position compensation.

FIG. 75 shows a screen for confirming the portion to be used for position compensation. As shown, the upper portion of the screen displays a confirmation reading that "this portion is used for position compensation." The screen displays two squares or boxes RA3 showing portions to be used for position compensation. Thus, the operator may select "yes" on the screen, to confirm the intention of position compensation.

In this case, if it is determined that the portion is to be used for position compensation ("yes" in a step 7305), the internal setting process for 2 model position compensation is performed by using the determined two portions (a step 7306).

On the other hand, if "correct" is selected on the screen of FIG. 75 ("correct" in step 7505), the search model is reset. More specifically, the first search model setting process (a step 7307) and the second search model setting process (a step 7308) are performed. These processes are performed interactively with the screen.

Figure 76:
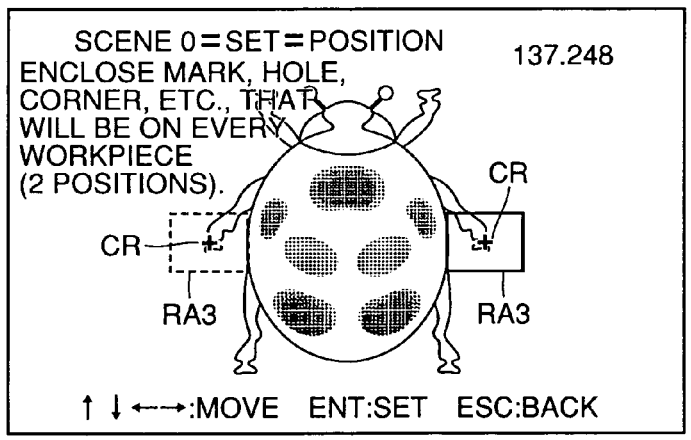
FIG. 76 is a diagram shown in conjunction with a screen for resetting a search model.

FIG. 76 shows a screen for instructing to reset the search model. As shown, the upper portion of the screen displays an instruction to reset the search model reading that "enclose mark, hole, corner, etc., that will be on every workpiece (two positions)." The screen newly displays two boxes RA3 (cursors CR included). Two search models can newly be set by using these cursors CR.

Then, the movement range setting process of the first model (a step 7309) and that of the second model (a step 7310) are sequentially performed. These processes are also performed interactively with the screen.

Figure 77:
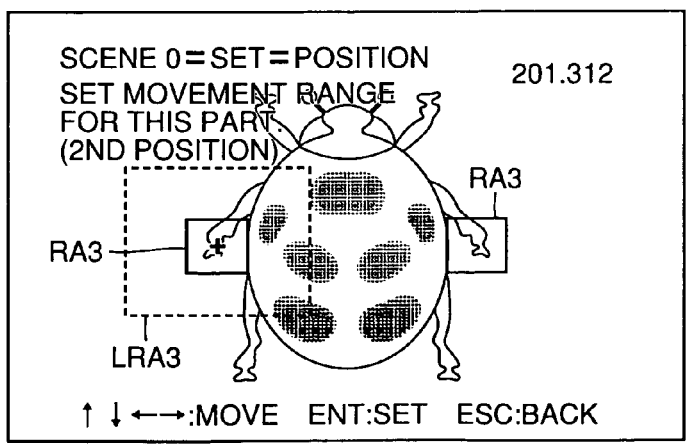
FIG. 77 is a diagram shown in conjunction with a screen instructing to set the movement range of the search model.

FIG. 77 shows a screen for instructing to set the moving range of the search model. As shown, the upper left portion of the screen displays an instruction to set the movement range of the search model reading that "set movement range for this part." The screen displays a large box LRA3 enclosing a square RA3 which in turn encloses the search model. Large box LRA3 enclosing the search model can arbitrarily be adjusted in size and position by the key operation of console 101. The operator can set the movement range by the key operation of console 101 for two search models which are newly set.

Figure 78:
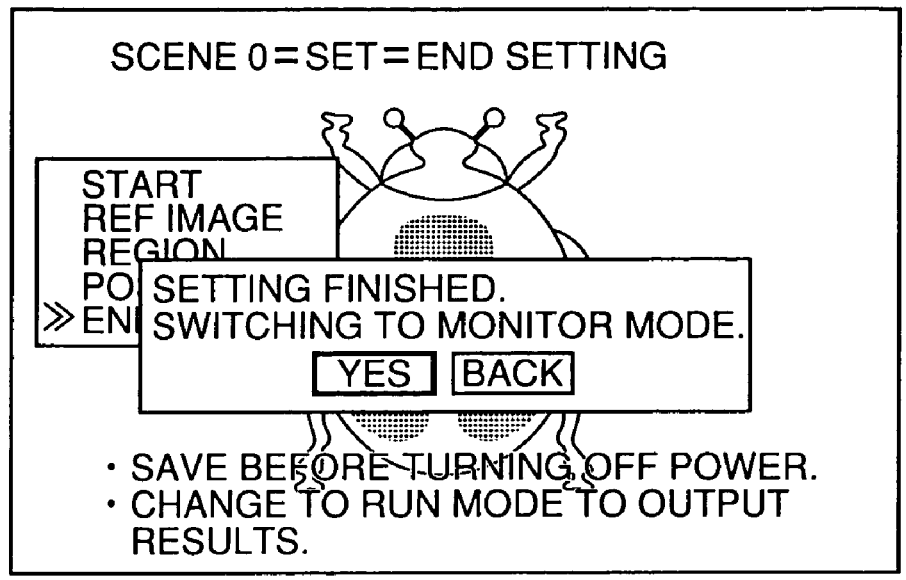
FIG. 78 is a diagram shown in conjunction with a screen when the setting is finished.

Returning to FIG. 6, a process of ending the setting (a step 606) will be described. FIG. 78 shows a screen when ending the setting. As shown, the central portion of the screen displays a guidance indicating completion of setting, reading that "settings finished, switching to monitor mode." Two options to select for confirmation are displayed therebelow, i.e., "yes" and "back." Further, the lower portion of the screen displays an instruction for fail safe reading that "save before turning off" and "change to run mode to output results."

When the setting process for the comparing program is completed as described above, successively, an actual image (an input image) which is newly incorporated is subjected to image comparison in accordance with the preliminary set comparing program. Thus, a verification/measurement process is performed on non-defective or defective products.

FIG. 79 shows a screen during verification/measurement. As shown, in each inspection region defined by a box on the screen, it is displayed if the inspection result is OK or NG on the actual product image. Thus, the operator can look at video monitor 103 to visually verify the statuses of products 502 at different inspection sites, which are transported by belt conveyer 501. In addition, the finished status data of the product 502 is separately transmitted to a personal computer, PLC 104 or the like and used in an aggregation process or plant control process.

As described above, according to the present embodiment, the operation guidance of the expert system application is displayed in teaching or setting the reference image and comparing program in controller 100 by using console 101 and video monitor 103. Accordingly, even a beginner user not experience with this type of visual inspection system can easily and appropriately set the comparing program suitable for the reference image and inspection method (such as presence inspection, conformance inspection, orientation inspection, position inspection, dimension inspection, chip and burr inspection and surface defect inspection). In addition, the process of position compensation can easily be performed.

The process of setting the reference image can be performed by a manually giving instructions by console 101 or by performing the STEP operation in accordance with detection signal DTS from synchronous sensor 105. Thus, an optimum image input is achieved according to a transportation speed of product 502 on belt conveyer 501 or the like.

Further, in the process of setting the comparing program, prior to setting the type of inspection (such as presence inspection, conformance inspection, orientation inspection, position inspection, dimension inspection, chip and burr inspection and surface defect inspection), the contents of this inspections can be recognized by reading sentences and referring to illustrations. Thus, even a beginner user can select an optimum type of inspection prior to the inspection. In addition, specific applications in the industry of each type of inspection can be explained in the form of sentences, so that the user can select the optimum type of inspection based on more concrete examples.

Prior to the selection of the type of inspection, the types of inspections to be selected can be collectively displayed in a list. In this respect, the selection of the type of inspection is further facilitated.

Moreover, in setting the comparing programs suitable for each type of inspection, items specific to each type of inspection can be set interactively with the screen. Thus especially the beginner user can properly perform the setting or teaching process like a professional operator.

In the above described embodiment, the image processing apparatus of the present invention is applied to the visual inspection system. However, the present invention is not limited to this. More specifically, the image processing apparatus of the present invention can be widely applied to an apparatus of the type comparing an arbitrary image with a reference image and enables the operator to set the image comparing program for the comparison. It is not limited to an apparatus such as the visual inspection system which determines the comparison result either non-defective or defective, but also to an apparatus displaying the comparison result by numerical values in analog manner.

Further, the method of inspecting the image is not limited to the above described seven types of inspections according to the embodiment. Any other inspection methods may be applied.

As in the foregoing, a required operation guidance is automatically performed by inputting the type of inspection. Accordingly, even a beginner user can easily set an optimum image comparing program suitable for a target workpiece and a desired type of inspection nearly by following the operation guidance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for performing, using a reference image, a set process for inspecting an input image of a product to be inspected, comprising:
   inspection type inputting means for inputting a type of inspection; and
   operation guiding means for guiding an operation required to set an inspection program suitable for said type of inspection input by said inspection type inputting means, wherein said inspection program set is automatically selected from among a plurality of inspection programs based on the type of inspection input,
   wherein said operation guiding means comprises means, including said inspection program, for guiding, when a presence inspection to inspect presence of a predetermined character at a particular position of said product to be inspected is input as said type of inspection by said inspection type inputting means, an operation of specifying an inspection method including options of shape, size, and brightness.

2. The image processing apparatus according to claim 1, wherein said operation guiding means guides an operation of specifying an image range that becomes a subject of said presence inspection, after said presence inspection is input as said type of inspection and before guiding an operation of specifying an inspection method.

3. An image processing apparatus for performing, using a reference image, a set process for inspecting an input image of a product to be inspected, comprising:
   inspection type inputting means for inputting a type of inspection; and
   operation guiding means for guiding an operation required to set an inspection program suitable for said type of inspection input by said inspection type inputting means, wherein said inspection program set is automatically selected from among a plurality of inspection programs based on the type of inspection input,
   wherein said operation guiding means comprises means, including said inspection program, for guiding, when a conformance inspection to inspect whether the type of said product to be inspected matches a preregistered product is input as said type of inspection by said inspection type inputting means, an operation of specifying an inspection method including options of shape, size, number of lines, and brightness.

4. The image processing apparatus according to claim 3, wherein said operation guiding means guides an operation of specifying an image range that becomes a subject of said conformance inspection after guiding an operation of specifying an inspection method.

5. An image processing apparatus for performing, using a reference image, a set process for inspecting an input image of a product to be inspected, comprising:
   inspection type inputting means for inputting a type of inspection; and
   operation guiding means for guiding an operation required to set an inspection program suitable for said type of inspection input by said inspection type inputting means, wherein said inspection program set is automatically selected from among a plurality of inspection programs based on the type of inspection input,
   wherein said operation guiding means comprises means, including said inspection program, for guiding, when an orientation inspection to inspect whether a direction or front/back side of said product to be inspected is proper or not is input as said type of inspection by said inspection type inputting means, an operation of specifying an inspection method including options of shape, size, number of lines, and brightness.

6. The image processing apparatus according to claim 5, wherein said operation guiding means guides an operation of specifying an image range that becomes a subject of said orientation inspection, after guiding an operation of specifying an inspection method.

7. An image processing apparatus for performing, using a reference image, a set process for inspecting an input image of a product to be inspected, comprising:
   inspection type inputting means for inputting a type of inspection, and
   operation guiding means for guiding an operation required to set an inspection program suitable for said type of inspection input by said inspection type inputting means, wherein said inspection program set is automatically selected from among a plurality of inspection programs based on the type of inspection input,
   wherein said operation guiding means comprises range specify guiding means, including said inspection program, for guiding, when a position inspection to inspect whether a position of a character specified in said product to be inspected is within a proper range or not is input as said type of inspection by said inspection type inputting means, an operation of specifying the position subjected to inspection, and specifying said proper range.

8. The image processing apparatus according to claim 7, wherein said range specify guiding means guides an operation of specifying a magnification for correspondence between a dimension in an image and actual dimension to specify said proper range in said actual dimension.

9. An image processing apparatus for performing, using a reference image, a set process for inspecting an input image of a product to be inspected, comprising:
   inspection type inputting means for inputting a type of inspection, and operation guiding means for guiding an operation required to set an inspection program suitable for said type of inspection input by said inspection type inputting means, wherein said inspection program set is automatically selected from among a plurality of inspection programs based on the type of inspection input,
   wherein said operation guiding means including said inspection program comprises 2 point specify guiding means for guiding, when a dimension inspection to inspect whether a position relation or distance between two points specified at said product to be inspected is within a proper range is input as said type of inspection by said inspection type inputting means, an operation of specifying a position of said two points and specifying said proper range, and
   wherein said 2 point specify guiding means comprises means for guiding an operation of specifying a magnification for correspondence between a dimension in an image and an actual dimension to specify said proper range in said actual dimension.

10. An image processing apparatus for performing, using a reference image, a set process for inspecting an input image of a product to be inspected, comprising:
    inspection type inputting means for inputting a type of inspection, and operation guiding means for guiding an operation required to set an inspection program suitable for said type of inspection input by said inspection type inputting means,
    wherein said operation guiding means comprises means for guiding, when a chip and burr inspection to inspect absence of improper chip or burr at an outer circumferential edge of said product to be inspected is input as said type of inspection by said inspection type inputting means, an operation of specifying a type of graphical shape to specify an inspection range from options of a lines circle and arc.

11. An image processing apparatus for performing, using a reference image, a set process for inspecting an input image of a product to be inspected, comprising:
    inspection type inputting means for inputting a type of inspection, and
    operation guiding means for guiding an operation required to set an inspection program suitable for said type of inspection input by said inspection type inputting means, wherein said inspection program set is automatically selected from among a plurality of inspection programs based on the type of inspection input,
    wherein said operation guiding means comprises means, including said inspection program, for guiding, when a surface defect inspection to inspect absence of visual defect in a specified range of said product to be inspected is input as said type of inspection by said inspection type inputting means, guiding an operation of specifying an image range that becomes a subject of inspection.

* * * * *